United States Patent
Li et al.

(10) Patent No.: US 6,757,248 B1
(45) Date of Patent: Jun. 29, 2004

(54) PERFORMANCE ENHANCEMENT OF TRANSMISSION CONTROL PROTOCOL (TCP) FOR WIRELESS NETWORK APPLICATIONS

(75) Inventors: Xiang Li, Beijing (CN); Jing Wu, Ottawa (CA); Shiduan Cheng, Beijing (CN); Jian Ma, Beijing (CN)

(73) Assignee: Nokia Internet Communications Inc., Mountain View, CA (US)

( * ) Notice: Subject to any disclaimer, the term of this patent is extended or adjusted under 35 U.S.C. 154(b) by 603 days.

(21) Appl. No.: 09/594,443

(22) Filed: Jun. 14, 2000

(51) Int. Cl.[7] ................. G01R 31/08; H04L 12/28
(52) U.S. Cl. ............. 370/235; 370/252; 370/394; 370/395.1; 709/234
(58) Field of Search ............... 370/229, 230, 370/235, 231, 394, 392, 333, 252, 401, 466, 395.1; 709/235, 234; 714/748, 749

(56) References Cited

U.S. PATENT DOCUMENTS 5,974,028 A * 10/1999 Ramakrishnan ......... 370/229
6,535,515 B1 * 3/2003 Hasegawa et al. ..... 370/395.52
6,591,382 B1 * 7/2003 Molloy et al. ............. 714/704

OTHER PUBLICATIONS

Database WW.IETF.ORG NewReno Modification to TCP's Fast Recovery Algorithm.
Allman et al., Standards Track, RFC 2581, "TCP Congestion Control," Apr. 1999.
Floyd et al., Standards Track, RFC 2582, "NewReno Modification to TCP's Fast Recovery," Apr. 1999.
Mathis et al., Standards Track, RFC 2018, "TCP Selective Acknowledgement Options," Oct. 1996.
Ramakrishnan et al., Experimental, RFC 2481, "ECN to IP," Jan. 1999.
Postel (ed.), RFC 793, "Transmission Control Protocol: DARPA Internet Program," Sep. 1981.
Schulzrinne et al., Standards Track, RFC 1889, "RTP," Jan. 1996.
Stevens, Standard Track, RFC 2001, "TCP," Jan. 1997.

* cited by examiner

Primary Examiner—Duc Ho
(74) Attorney, Agent, or Firm—Antonelli, Terry, Stout & Kraus, LLP

(57) ABSTRACT

A new Fast Recovery Plus (FR+) mechanism, and associated method, for wireless and/or mobile network applications to control data flow and avoid network congestion in a TCP/IP packet-switched network.

30 Claims, 19 Drawing Sheets

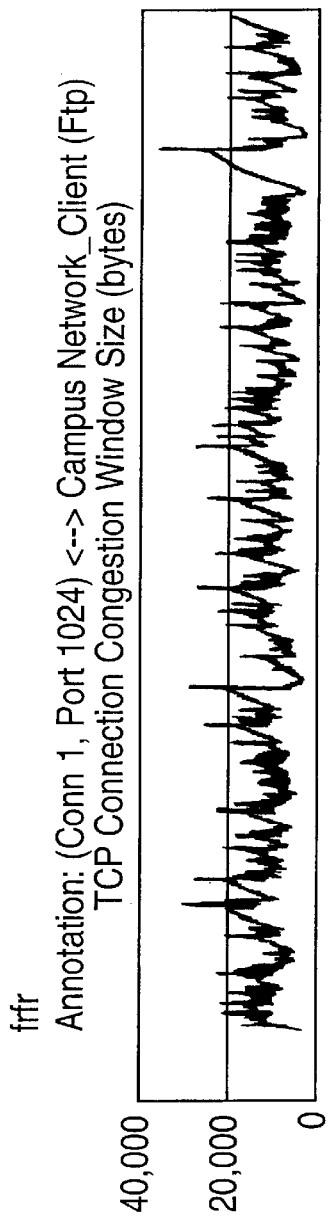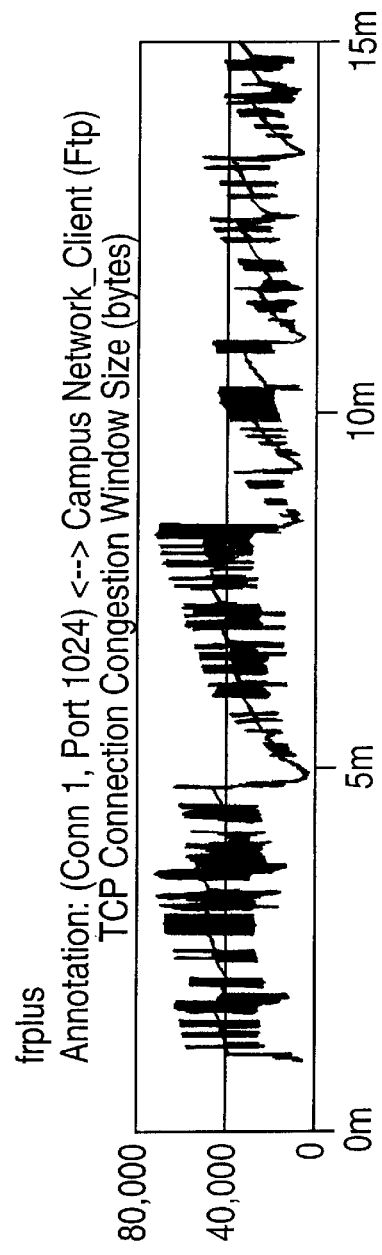

○ frplus_frfr2
○ Annotation: (Conn 1, Port)
◇ frfr
◇ Annotation: (Conn 1, Port)

TCP Connection Sent Segment Sequence

○ frplus_frfr2
◇ frfr2 queue overflows frplus_frfr2
point-to-point throughout (bits/sec)

frplus_frfr2
queue.queue size (packets)

frplus_frfr2
point-to-point throughout (bits/sec)

frfr2
queue.queue size (packets)

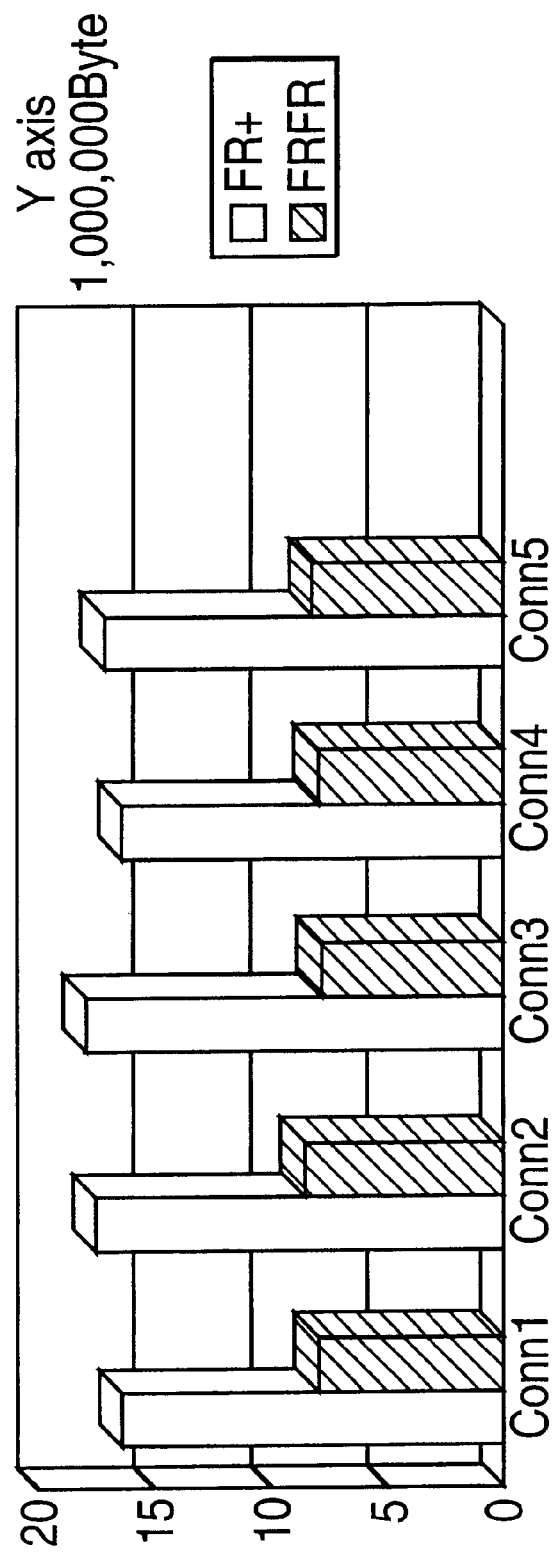

frfr1 frplus1 frfr1 frplus1

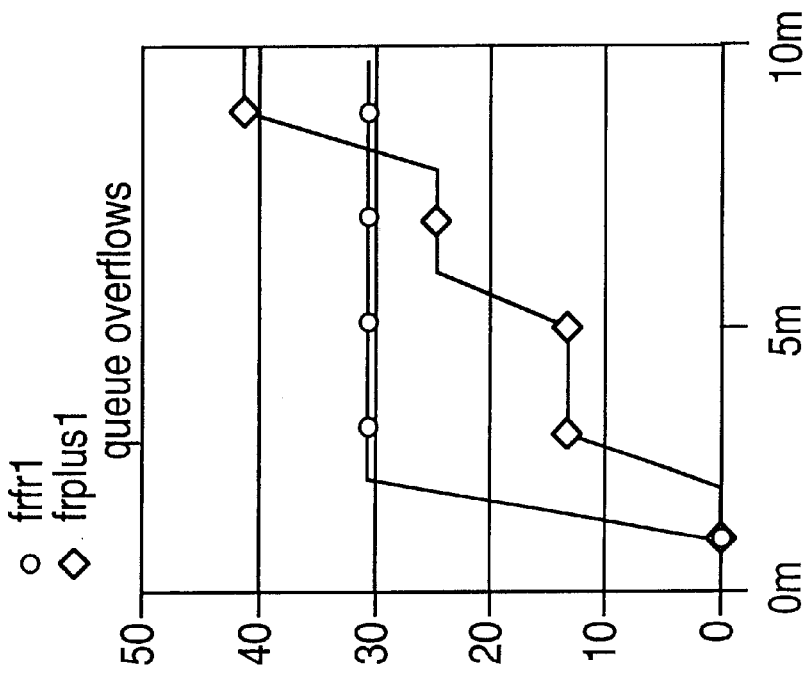
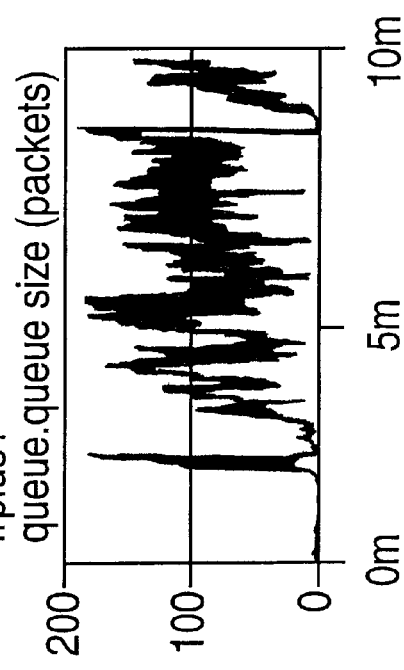

PERFORMANCE ENHANCEMENT OF TRANSMISSION CONTROL PROTOCOL (TCP) FOR WIRELESS NETWORK APPLICATIONS

BACKGROUND OF THE INVENTION

1. Technical Field

The present invention relates to a serial of transfer protocols for high-quality and high-speed data transfer in data networks, especially wireless or mobile networks, and more particularly, relates to performance enhancement of Transmission Control Protocol (TCP) for wireless network applications.

2. Related Art

A data network is a collection of network devices, or nodes interconnected by point-to-point links. Communication links may be wired (i.e., optical fiber) or wireless (i.e., infrared or radio-frequency) for supporting a number of logical point-to-point channels. Each channel may be a bi-directional communication path for allowing commands and message data to flow between two network devices or nodes within the data network. Network devices or nodes may be categorized as either end systems or routers, which are also known as intermediate systems or communication gateways. End systems may include PCs, workstations, mainframes, file servers, storage devices and other types of computers. Router may include a number of communication links for forwarding data arriving over one link onto another link for transmission to an end system or another router.

Generally, end systems both send data to other end stations on the data network and receive data sent by other end systems on the data network. When an end system serves as a sender of data, it is referred to as a source for that data; whereas, when such an end station serves as a receiver of data, it is referred to as a destination for the data. Typically, end systems may act as both sources and destinations depending upon whether they are sending or receiving data. When acting as a source, the end system sends data in the form of messages over a communication link to a router for transferring the messages to an end system or another router.

Each message may comprise a sequence of information bits. Typically, however, the messages sent over the data network are not sent as a continuous, uninterrupted stream of bits. Rather, they are divided up into smaller blocks of information called packets, which are then transmitted individually. Each packet has a predetermined maximum length. In addition to a data field which contains the data to be transferred, a packet also includes a header field which contains control information such as format, identifiers which indicate what portion of the message is contained in the packet, the source of the packet and the intended destination of the packet. When the packets which together contain a message reach the destination, the destination processes them by assembling their data fields into proper order to reconstruct the full message.

One important design objective in data networks is controlling the flow of packets so that such packets may not be transmitted at a faster rate than they can be processed by the routers through which the packets may pass or by the destinations. Even in the simplest data network consisting of two end systems interconnected by a router, for example, the source may flood the destination if it transmits packets faster than they can be processed by the destination. In more complicated networks consisting of many end systems, numerous routers and alternative communication paths between the end systems, the likelihood of problems from excess communication traffic is significantly greater. This becomes especially true as the number of active end systems on the network increases and if communication speeds of the equipment within the network are mismatched. A mismatch may exist if, for example, a router cannot transfer packets as fast as they are being sent to it by the source. A mismatch may also exist between the speed at which the link can transmit packets, namely the link speed, and the rate at which the router can transfer packets. Predictably, as the complexity of the network increases, achieving an acceptable traffic control also becomes more difficult.

On most networks, including TCP/IP packet-switched networks in which Transmission Control Protocol (TCP) [RFC 793, September 1981] may be implemented to ensure high-speed and high-quality data transfer in the Internet, at least two basic mechanisms are normally used for dealing with excess traffic arriving at a destination. One mechanism involves the use of buffers and the other involves flow control. In buffered systems, both the routers and the end systems are provided with buffer memory to handle overloads. Arriving traffic which exceeds the processing rate of the device is temporarily stored in the buffer memory until the device can process it. Buffers offer a satisfactory solution to excess traffic problems only if the overload is transitory. If the overload persists for too long, the buffers may become full after which the additional packets are rejected or destroyed.

The other mechanism, generally referred to as flow control, deals with the allocation of resources at the destination, such as memory and processing. Generally, in accordance with flow control, the destination sets a limit on the rate at which each source sending data to the destination may transmit that data. The sources and the destinations coordinate the transfer of data by an exchange of messages containing requests and acknowledgments. Before the source starts sending packets, it will send a request to the destination seeking permission to begin transmission. In response to the request, the destination sends a message containing an identification of the number of packets the source may dispatch toward the destination without, further authorization. This number is commonly referred to as the window size. The source then proceeds to transmit the authorized number of packets toward the destination and waits for the destination to verify their receipt. After the destination successfully receives a packet, it sends a message back to the source containing an acknowledgment indicating the successful receipt of the packet and, in some cases, authorizing the source to send another packet. In this way, the number of packets on the network traveling from the source toward the destination will never be more than the authorized window size.

Neither of these mechanisms, however, satisfactorily deals with the distribution of traffic within the network. Even with these mechanisms in place, on a busy network it is likely that many sources will simultaneously send traffic over the network to more than one destination. If too much of this traffic converges on a single router in too short a time, the limited buffer capacity of the router will be unable to cope with the volume and the router will reject or destroy the packets. When this happens, the network is said to be congested.

Then the network is congested, network performance degrades significantly. The affected sources have to retransmit the lost or rejected packets. Re-transmissions, however, necessarily use network resources such as buffer storage, processing time and link bandwidth to handle old traffic thereby leaving fewer resources for handling those portions of the messages still waiting to be transmitted for the first time. When that occurs, network delays increase drastically and network throughput drops. Indeed, since some network resources are being dedicated to handling re-transmissions at a time when the network is already experiencing a heavy load, there is a substantial risk of the congestion spreading and locking up the entire network.

A variety of alternative approaches exist for dealing with network congestion. Generally, the approaches fall into two categories. One category involves placing limitations on the amount of traffic which will be permitted on the network at any given time. Examples include the preallocation of buffers at the routers to ensure that memory is available to store arriving packets until they can be forwarded. The other category involves methods of limiting the spread of congestion once it occurs and then extricating the network from its congested state. The second category of approaches for dealing with network congestion is commonly referred to as congestion control. Congestion control typically involves feedback which signals the onset of congestion and instructs end systems to decrease the rate at which they initiate transmission of packets.

Currently, there are several schemes to avoid congestion and unnecessary delay for packets from low-bandwidth delay-sensitive TCP connections in the TCP/IP networks. Such proposals are described, for example, in M. Allman, V. Paxson, W. Stevens, "*TCP Congestion Control*", RFC2581, April 1999; Mathis, M., Mahdavi, J., Floyd, S., and Romanow, A., "*TCP Selective Acknowledgement Options*", RFC 2018, October 1996; S. Floyd and T. Henderson, "*The NewReno Modification to TCP's Fast Recovery Algorithm*", RFC2582, April 1999; Stevens, W., "*TCP Slow Start, Congestion Avoidance, Fast Retransmit, and Fast Recovery Algorithms*", RFC 2001, January 1997; K Ramakrishnan, S. Floyd, "*A Proposal To Add Explicit Congestion Notification (ECN) To IP*", RFC 2481, April 1999; and Prasad Bagal, Shivkumar Kalyanaraman, Bob Packer, "*Comparative study of RED, ECN and TCP Rate Control*", Technical Report, March 1999.

De facto standard implementations of TCP congestion control algorithms are described in RFC 2581 and RFC 2582, which employs both Fast Retransmit algorithm and Fast Recovery algorithm (FRFR), also known as Reno algorithms. These two algorithms rely on counting "duplicate ACKs"—TCP immediate acknowledge sent from the destination in response to each additional data segment received following missing data. Fast Retransmit and Fast Recovery (FRFR) algorithms are intended to preserve self-clock during recovery from a lost data segment. Fast Retransmit algorithm uses duplicate ACKs to detect the loss of a data segment. When three duplicate ACKs are detected, TCP assumes that a data segment has been lost and retransmit the lost packet, without waiting for a retransmission timer to expire. The Fast Recovery algorithm attempts to estimate how much data remains outstanding in the network by counting duplicate ACKs. The Fast Recovery algorithm artificially inflates the congestion window "CWND" (i.e., TCP state variable that limits the amount of data a TCP source can send) on each duplicate ACK that is received, causing new data to be transmitted as the congestion window "CWND" becomes large enough. Fast Recovery algorithm allows one (halved) window of new data to be transmitted following a Fast Retransmit. After the lost packet has been acknowledged, the congestion window "CWND" should be reduced and the TCP source would come into the state of congestion avoidance. However, Reno algorithms and current modifications of Fast Retransmit/Fast Recovery (FRFR) algorithm are oriented to wired networks with very small transmission error, since the TCP assumes that the packet loss due to damage is extremely rare and the overwhelming majority of lost packets is due to congestion.

For wireless networks, however, TCP assumption is generally false—most lost packets are due to errors that occur in the transmission of packets over error-prone media such as infrared or radio-frequency links, as opposed to network congestion. When these transmission errors occur, known as Bit Error Rate (BER), TCP mistakenly assumes that the network is congested and dramatically reduces its transmission of old and new packets. For example, whenever a packet is lost, TCP automatically resets its current window and threshold, then traps in the state of Slow-Start frequently, which may sharply degrade the throughput of connection. Although other congestion control algorithms are available to minimize the impact of losses from a throughput perspective, none is intended to distinguish the packet loss due to Bit Error Rate (BER) from loss due to congestion. As a result, TCP would still have to avoid the congestion that may not exist at all.

Accordingly, there is a need for a new and efficient mechanism provided to improve the TCP performance in high-speed packet-switched networks, especially wireless or mobile networks. A new algorithm is needed to distinguish congestion packets loss from individual packet loss due to Bit Error Rate (BER), to reject coming into Slow-Start and facilitate fast recovery when lost packets are due to Bit Error Rate (BER), and to reduce its sending speed as normal TCP upon occurrence of congestion so as to improve the throughput of connection in wireless and/or mobile networks.

SUMMARY OF THE INVENTION

Accordingly, various embodiments of the present invention are directed to a new recovery mechanism known as Fast Recovery Plus (FR+) algorithms and associated method, for wireless and/or mobile network applications to distinguish congestion packets loss from individual packet loss due to Bit Error Rate (BER), to advance fast data recovery when lost packets are due to Bit Error Rate (BER), and to reduce its sending speed as normal TCP upon occurrence of congestion so as to improve the throughput of connection while effectively avoiding network congestion in a TCP/IP packet-switched network such as wireless and/or mobile networks. Such enhanced Recovery Plus (FR+) algorithms may be installed or integrated into a host and/or a computer readable medium for use in a host for promoting fast data recovery while effectively controlling network congestion in packet-switched networks, especially wireless or mobile networks.

In accordance with an embodiment of the present invention, a method of flow control and congestion avoidance congestion in a network comprises the steps of: transmitting, at a source node, data packets to a destination node, via at least an intermediate node; receiving, at the destination node, data packets transmitted from the source node, via the intermediate node, and generating a duplicate ACK back to the source node to inform the source node that a data packet was received out-of-order in the network and serves as an indication that a data packet has been lost; upon receipt of a designated number of duplicate ACKs, at the source node, determining that a data packet has been lost; initializing a counter, at the source node, and recording a congestion window CWND, a slow start threshold Ssthresh, and a maximal sequence number SN that has been sent into the network; upon receipt of a next duplicate ACK, at the source node, recording its acknowledged sequence number ACK_SN; determining, at the source node, if the acknowledged sequence number ACK_SN is no more than a recorded sequence number SN; otherwise, incrementing the counter, at the source node, and re-transmitting a lost packet; if the acknowledged sequence number ACK_SN is no more than the recorded sequence number SN, determining if the packet loss is due to a transmission error; and if the packet loss is due to the transmission error, setting, at the source node, the slow start threshold Ssthresh to Max(CWND, (Ssthresh+CWND)/2), wherein said CWND and Ssthresh exhibit values previously recorded.

Specifically, the slow start threshold Ssthresh is set to no more than Max(FlightSize/2, 2*SMSS), wherein said FlightSize indicates the amount of outstanding data in the network, and said SMSS indicates the size of a largest data segment that can be transmitted. The counter is set to record the number of times of packet re-transmission invoked by the duplicate ACKs. In addition, packet loss is due to the transmission error, when the value of the counter is no more than a pre-defined packet threshold indicating the threshold of packet loss. Otherwise, packet loss is due to congestion in which case the congestion window CWND is reduced to halve, and a slow start threshold Ssthresh is reduced to the congestion window to slow a transmission rate to avoid congestion in the network.

In accordance with another embodiment of the present invention, a data network for wireless and/or mobile network applications may comprise a source node for transmitting data packets; a destination node for receiving the data packets from the source node and generating duplicate ACKs when the arrival of data packets is out-of-order; and at least one intermediate node disposed between said source node and said destination node; wherein said source node includes a Fast Recovery Plus (FR+) algorithm which, when activated upon receipt duplicate ACKs, performs the following: initializing a counter and recording a congestion window CWND, a slow start threshold Ssthresh, and a current maximal sequence number SN that has been sent into the network; upon receipt of a next duplicate ACK, recording its acknowledged sequence number ACK_SN; determining if the acknowledged sequence number ACK_SN is no less than a recorded sequence number SN; if the acknowledged sequence number ACK_SN is no less than the recorded sequence number SN, incrementing the counter, and re-transmitting a lost packet; if the acknowledged sequence number ACK_SN is no more than the recorded sequence number SN, determining if the packet loss is due to a transmission error; and if the packet loss is due to the transmission error, setting the slow start threshold Ssthresh to Max(CWND, (Ssthresh+CWND)/2), wherein said CWND and Ssthresh exhibit values previously recorded In accordance with yet another embodiment, the present invention relates to a computer readable medium having an enhanced Fast Recovery Plus (FR+) algorithm stored therein for wireless network applications, when executed by a host system, performs the following: upon receipt of duplicate ACKs from a remote system, determining that a data packet has been lost; initializing a counter, and recording a congestion window CWND, a slow start threshold Ssthresh, and a maximal sequence number SN that has been sent into the network; upon receipt of a next. duplicate ACK, recording its acknowledged sequence number ACK_SN; determining if the acknowledged sequence number ACK_SN is no more than a recorded sequence number SN; if the acknowledged sequence number ACK_SN is more than the recorded sequence number SN, incrementing the counter, and retransmitting a lost packet; if the acknowledged sequence number ACK_SN is no more than the recorded sequence number SN, determining if the packet loss is due to a transmission error; and if the packet loss is due to the transmission error, setting the slow start threshold Ssthresh to Max(CWND, (Ssthresh+CWND)/2), wherein said CWND and Ssthresh exhibit values previously recorded.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIGS. 8A–8B illustrate simulation results in terms of the congestion window "CWND" of the single connection network executing the Reno (FRFR) algorithm and the advanced Fast Recovery Plus (FR+) algorithm in low-speed links without congestion;

FIG. 20 illustrates simulation results in terms of the TCP Sequence Number "SN" of all connections executing the Reno (FRFR) algorithm and the advanced Fast Recovery Plus (FR+) algorithm in high-speed links without congestion;

FIG. 20 illustrates simulation results in terms of the TCP Sequence Number "SN" of all connections executing the Reno (FRFR) algorithm and the advanced Fast Recovery Plus (FR+) algorithm in high-speed links without congestion;

FIGS. 21A–21B illustrate simulation results in terms of the congestion window "CWND" of one connection in the multiple connection network executing the Reno (FRFR) algorithm and the advanced Fast Recovery Plus (FR+) algorithm in high-speed links without congestion;

FIGS. 22A–22B illustrate simulation results in terms of the Utilization of Link of one connection in the multiple connection network executing the Reno (FRFR) algorithm and the advanced Fast Recovery Plus (FR+) algorithm in high-speed links without congestion;

FIGS. 26A–26B illustrate simulation results in terms of the Queue Size in the Router of the multiple connection network executing the Reno (FRFR) algorithm and the advanced Fast Recovery Plus (FR+) algorithm in high-speed links with congestion; and FIG. 27 illustrates simulation results in terms of data overflows of the multiple connection network executing the Reno (FRFR) algorithm and the advanced Fast Recovery Plus (FR+) algorithm in high-speed links with congestion.

DETAIL DESCRIPTION OF EMBODIMENTS OF THE INVENTION

The present invention is applicable for use with all types of data networks, including packet-switched networks, interconnected systems of such networks and transmission protocols used for data transfer between host systems in such networks. However, for the sake of simplicity, discussions will concentrate mainly on the use of Transmission Control Protocol (TCP) as a highly reliable host-to-host protocol between host systems in TCP/IP networks including the Internet, and in interconnected systems of such networks.

Figure 1A:
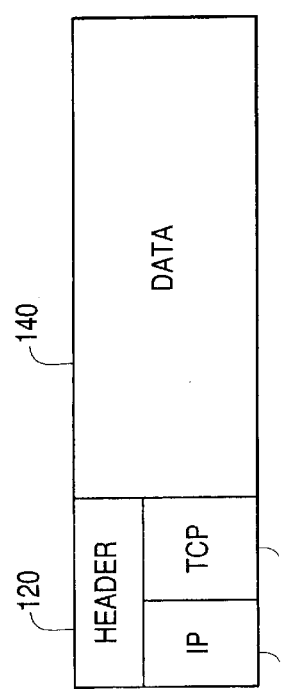
FIG. 1 illustrates a data packet for use in a packet-switched network according to an embodiment of the present invention.
Figure 1B:
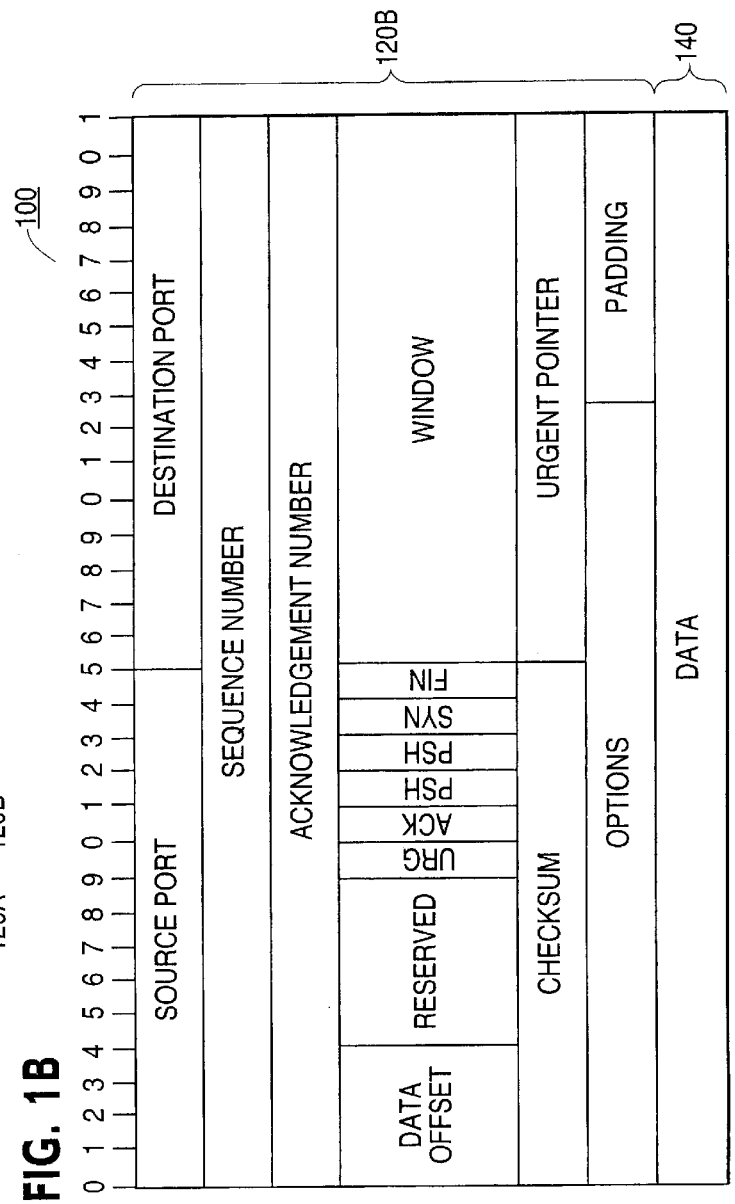

Attention now is directed to the drawings and particularly to FIGS. 1A–1B, a data packet for use in a packet-switched network according to an embodiment of the present invention is illustrated. As shown in FIG. 1A, a data packet 100 consists of a segment of data 140 and a small header 120 prepended to the data 140. The header 120 may contain an Internet Protocol (IP) header 120A and a Transmission Control Protocol (TCP) header 120B which follows the IP header 120A for supplying information specific to the TCP protocol. The IP header 120A may contain several information fields, including, for example, Internet Protocol (IP) addresses fields (Internet address, generally consisting of a network identifier and a host identifier), a version field used to specify which version of the IP is represented in the IP packet (for example, IP Version 4 and IP Version 6), a type of service field used to specify how the IP packet is to be handled in IP-based networks which offer various service qualities, and a header checksum field used to verify transmission error.

FIG. 1B illustrates an example TCP header format of the TCP header 120B of a data packet 100, as described by the classical TCP specification [RFC 793, September 1981]. Such a TCP header 120B may include, for example, Source Port Number, Destination Port Number, Sequence Number, Acknowledgment Number, Data Offset, Reserved Field for future use, Control Bits including URG (Urgent Pointer field significant), ACK (Acknowledgment field significant), PSH (Push Function), RST (Reset the connection), SYN (Synchronize sequence numbers) and FIN (no more data from sender), Window, Checksum, Urgent Pointer, Variable Options, and Padding. Acknowledgment Number may contain 32 bits for indicating the value of the next sequence number the TCP source is expecting to receive. Data Offset may contain 4 bits for indicating where the data begins. The Window may contain 16 bits for indicating the number of data octets beginning with the one indicated in the acknowledgment field which the TCP sender of the data segment is willing to accept. The Checksum may contain 16 bits for indicating the complement sum of all 16 bit words in the header and text. The Urgent Pointer may contain 16 bits for indicating the sequence number of the octet following the urgent data. The variable options may contain a multiple of 8 bits in length and may be included in the checksum. The variable header padding may be used to ensure that the TCP header ends and data begins on a 32 bit boundary.

Figure 2:
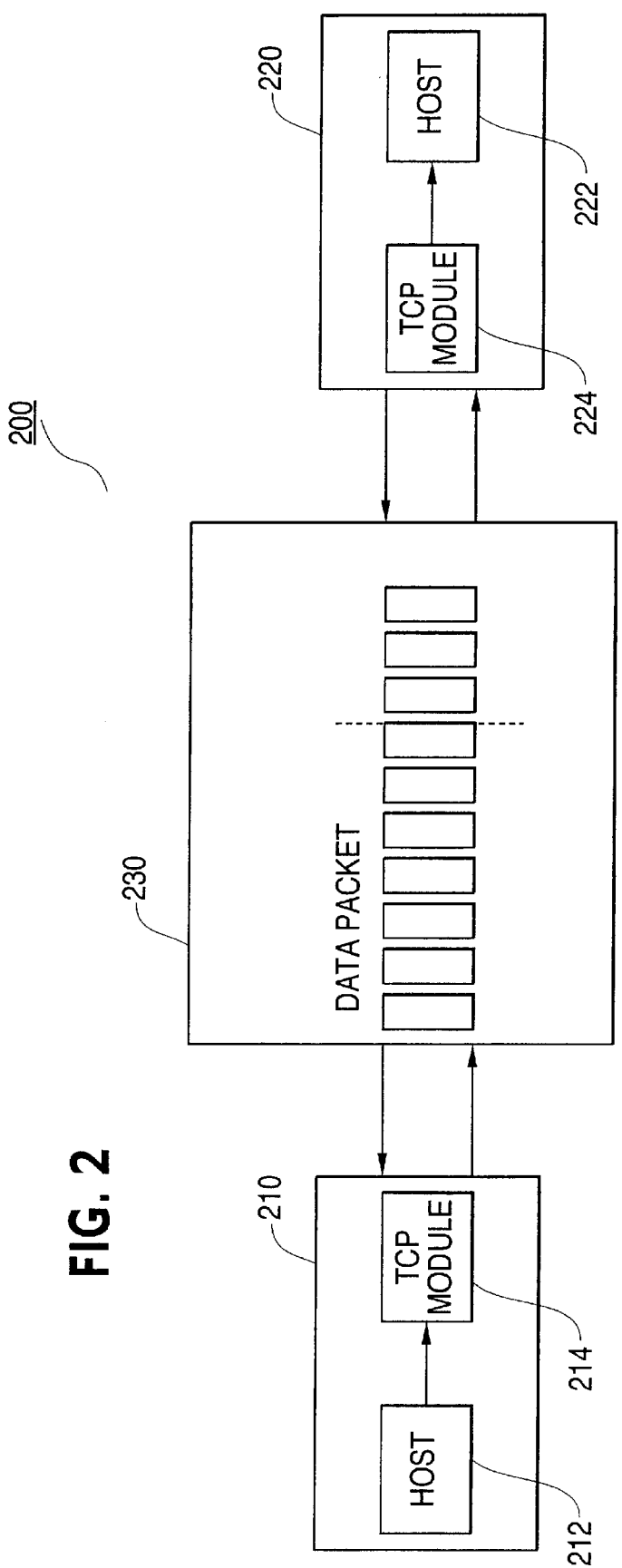
FIG. 2 illustrates an example packet-switched network using an existing congestion control mechanism installed therein for congestion control and avoidance in the network.

FIG. 2 illustrates an example packet-switched network 200 having existing flow control and congestion control mechanisms installed therein for flow control and congestion avoidance in the network. As shown in FIG. 2, the packet-switched network 200 includes, for example, a source node 210, a destination node 220, and an intermediate node 230. IP bandwidth-limited links 202 and 204 may be utilized to connect the source node 210 to the destination node 220. The IP bandwidth-limited links 202 and 204 may represent a low bandwidth link such as, for example, an integrated service digital service (ISDN) link and a modem link that connect to the source node 210 and the destination node 220. Alternatively, the TCP/IP bandwidth-limited links 202 and 204 may include an TCP/IP network of an Internet Service Provider (ISP), an Internet and different source and destination networks, including, for example, a packet-switched network that provides linkage between the source node 210 and the destination node 220.

The source node 210 and the destination node 220 are known as end systems which may correspond to PCs, workstations, mainframes, file servers, storage devices and other types of computers. The intermediate node 230 may correspond to a router or a communication gateway containing a number of communication links for forwarding data arriving over one link onto another link for transmission to an end system or another router.

In one embodiment, the source node 210 may include, but not limited to, a host 212 and a TCP module 214. Likewise, the destination node 220 may include, but not limited to, a host 222 and a TCP module 224. Both the TCP modules 214 and 224 may be installed independently from respective host, or may be installed in respective host. Alternatively, the TCP modules 214 and 224 may reside in respective network interface card (NIC) (not shown) installed in the source node 210 and destination node 220, respectively.

In the source node 210, the host 212 generates data which is forwarded to the TCP module 114. The TCP module 214 of the source node 210 transforms incoming data from host 212 into IP data packets 100 and injects the data packets 100 into the IP-based network 200. The rate of that data packets are injected into the TCP/IP network 200 and the outward flow of data packets 100 are controlled and managed by the TCP module 214 to avoid congestion and to limit bandwidth usage of IP packets in the TCP/IP network 200. The TCP/IP network 200 accepts incoming data packets 100 and forwards the same to the destination node 220 according to the information contained in the IP header 120. The TCP module 224 of the destination node 220 receives the data packets 100 from the TCP/IP network 200, transforms the same into data and forwards the data to the host 222.

The intermediate node 230 may or may not include mechanisms for the detection of incipient congestion. Either embodiment, such an intermediate node 230 may operate to drop data packets when there is a queue overflow. Packet drops serve as the method of informing the source node 210 of congestion in the TCP/IP network 200. When a packet is dropped from the intermediate node 230, a data segment arriving at the destination node 220 will be out-of-order.

Upon receipt of an out-of-order data segment, the destination node 220 generates an immediate acknowledge (a duplicate ACK) to inform the source node 210 that a data packet was received out-of-order and what sequence number is expected.

TCP flow control and congestion control mechanisms, such as Fast Retransmit and Fast Recovery algorithms, known as Reno algorithms as described in RFC 2581 and RFC 2582, are typically installed, for example, in the TCP module 214 of the source node 210 to control data flow and congestion avoidance in the TCP/IP network 200. Fast Retransmit algorithm and Fast Recovery algorithm are usually implemented together, and are invoked in response to the duplicate ACK—TCP immediate acknowledge sent from the destination node 220 in response to each additional data segment received following missing data. These two algorithms rely on counting "duplicate ACKs" and are intended to preserve self-clock during recovery from a lost data segment. Fast Retransmit algorithm uses duplicate ACKs to detect the loss of a data segment. When three duplicate ACKs are detected, the TCP module 214 of the source node 210 assumes that a data segment has been lost and retransmit the lost packet to the destination node 220, without waiting for a retransmission timer to expire. The Fast Recovery algorithm attempts to estimate how much data remains outstanding in the network by counting duplicate ACKs. The Fast Recovery algorithm artificially inflates the congestion window "CWND" (i.e., TCP state variable that limits the amount of data the TCP module 214 of a source node 210 can send) on each duplicate ACK that is received, causing new data to be transmitted as the congestion window "CWND" becomes large enough. Fast Recovery algorithm allows one (halved) window of new data to be transmitted following a Fast Retransmit. After the lost packet has been acknowledged, the congestion window "CWND" should be reduced and the TCP module 214 of the source node 210 would come into the state of congestion avoidance.

However, current TCP flow control and congestion control mechanisms, such as Reno (FRFR) algorithms and modifications of Fast Retransmit/Fast Recovery (FRFR) algorithms, as described with reference to FIG. 2, are oriented to wired networks with very small transmission error, since the TCP assumes that the packet loss due to damage is extremely rare and the overwhelming majority of lost packets is due to congestion.

For wireless networks, however, most lost packets are due to errors that occur in the transmission of packets over error-prone media such as infrared or radio-frequency links, as opposed to network congestion. When these transmission errors occur, known as Bit Error Rate (BER), the TCP module 214 of the source node 210 mistakenly assumes that the network is congested and dramatically reduces its transmission of old and new packets. For example, whenever a packet is lost, TCP module 214 of the source node 210 automatically resets its current window and threshold, then comes into the state of Slow-Start frequently, which may sharply degrade the throughput of connection. While other congestion control algorithms may be available to minimize the impact of losses from a throughput perspective, none is intended to distinguish the packet loss due to Bit Error Rate (BER) from loss due to congestion. As a result, TCP would still have to avoid the congestion that may not exist at all.

Figure 3:
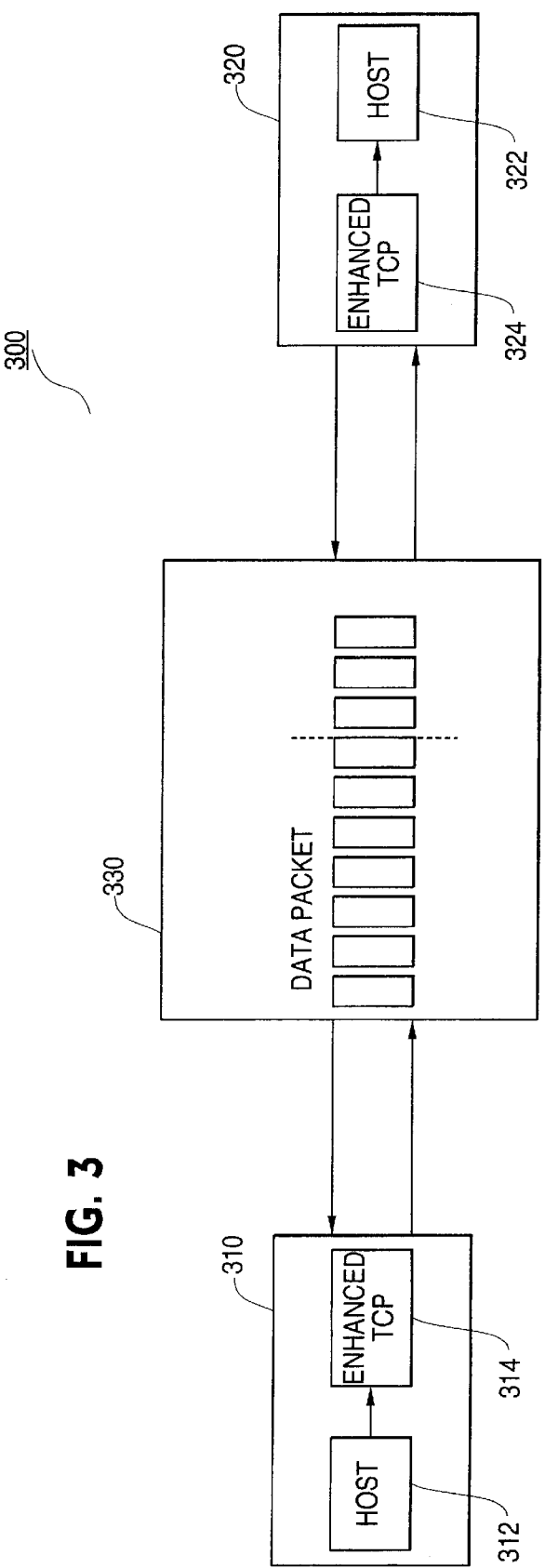
FIG. 3 illustrates an example packet-switched network using an advanced Fast Recovery Plus (FR+) mechanism installed therein for congestion control and avoidance in the network according to an embodiment of the present invention.

Turning now to FIG. 3, an example packet-switched network including a new and advanced Fast Recovery Plus (FR+) mechanism installed therein for flow control and congestion avoidance in the network according to an embodiment of the present invention is illustrated. As shown in FIG. 3, the packet-switched network 300 includes the same components, such as a source node 310, a destination node 320, and at least one intermediate node 330. The intermediate node 330 may operate to drop data packets, as described with reference to FIG. 2, when there is a queue overflow. Such packet drops may serve as the method of informing the source node 310 of congestion in the TCP/IP network 300. However, the communication links used to connect a source node 310 to a destination node 320 correspond to wireless links 306. In addition, enhanced TCP modules 314 and 324 of the respective source node 310 and destination node 320 contain a new and efficient Fast Recovery Plus (FR+) mechanism provided to distinguish congestion packets loss from individual packet loss due to Bit Error Rate (BER), to reject coming into Slow-Start and facilitate fast recovery when lost packets are due to Bit Error Rate (BER), and to reduce its sending speed as normal TCP upon occurrence of congestion so as to improve the throughput of connection and TCP performance in high-speed packet-switched networks, especially wireless or mobile networks. Such enhancements to the TCP modules 314 and 324 of respective source node 310 and destination node 320 may be implemented by a Fast Recovery Plus (FR+) algorithm or a software module configured to distinguish congestion packet loss from individual packet loss due to Bit Error Rate (BER) and advance fast recovery when lost packets are due to BER. The Fast Recovery Plus (FR+) algorithm implementation may rely on the use of standard programming methods using high level program languages, such as C, C++ and Visual Basic, and a general purpose (host) processor. In addition, the Fast Recovery Plus (FR+) algorithm is independent from, but is adaptable to all existing TCP flow control and congestion control mechanisms. Such Fast Recovery Plus (FR+) algorithm may be integrated into an existing operating system (OS) of a host processor (i.e., end node including a source node and a destination node) and/or a computer readable medium for use in a host processor (i.e., end node) for congestion control and avoidance in the TCP/IP network 300. Alternatively, the Fast Recovery Plus (FR+) algorithm may also be integrated into, or as part of, existing TCP flow control and congestion avoidance algorithms as described with reference to FIG. 2.

The Fast Recovery Plus (FR+) algorithm implementation may, however, operate based on the following assumptions:

(1) The throughput of an individual data flow may range from less than 2,400 bps to more than 10 Mbps.

(2) According to the difference between the number of packet loss due to BER and congestion, individual/small number of packet loss in the next data window will be treated as the result of sporadic transmission error. Otherwise, multiple packet loss will be treated as the indication of paroxysmal loss which may be led by congestion.

(3) When the TCP module 314 of the source node 310 finds a packet loss, the TCP module 314 records the number of packet loss in the next congestion window "CWND". If the number is no more than the threshold (which may be set as "1"), packet loss will be treated as sporadic loss due to sporadic transmission error. Otherwise, such packet loss will be treated as paroxysmal loss due to congestion.

(4) When sporadic packet loss occurs, the TCP module 314 of the source node 310 need not reduce its congestion window "CWND" to slow down the sending speed (transmission rate). Therefore, the value of slow start threshold "SSTHRESH" can be quickly recovered before packet loss, which is significantly different from the existing TCP flow control and congestion control mechanisms, such as Fast Retransmit/Fast Recovery algorithms, also known as Reno algorithms as described in RFC 2581 and RFC 2582. This way the TCP module 314 of the source node 310 can recover to its original speed very quickly.

(5) When a packet loss is due to congestion, the TCP module 314 of the source node 310 acts as normal TCP, that is, the TCP module 314 of the source node 310 resets its current congestion window and threshold, and comes into the state of Slow-Start.

(6) Before TCP can judge the reason of packet loss, the TCP module 314 of the source node 310 acts as normal TCP to avoid increasing the burden of the TCP/IP network 300.

(7) All sporadic packet loss may be treated as packet loss due to BER. There may be some exceptions. For example, the increase of round-trip timeout RTT may cause timeout and the error of router can also cause sporadic packet loss. In these situations, however, there is no harm to the TCP/IP network 300 and the TCP connection by keeping the same speed.

Specifically, the Fast Recovery Plus (FR+) algorithm implementation requires the following modifications:

(1) A counter is added, or included in the TCP module 314 of the source node 310 (or TCP module 324 of the destination node 320 for bidirectional data transmission) to record the number of lost packets in the LOSS window (LW) as defined in RFC 2581 (as the size of the congestion window "CWND" after the TCP module 314 of source node 310 detects packet loss using its retransmission timer), when the TCP module 314 of the source node 310 detects packet loss. Such a counter can be easily added in the TCP module 314 of the source node 310 since it is only an integer. Each time the Fast Recovery Plus (FR+) algorithm is invoked, the counter is set to "0". Then if the TCP module 314 of the source node 310 detects a packet loss, the TCP module 314 will retransmit the packet and increase the counter with "1". Separately, the congestion window "CWND" and the slow start threshold "Ssthresh" are also recorded by the TCP module 314 of the source node 310.

(2) When the TCP module 314 of the source node 310 has completed the transfer of the LOSS window "LW" (receive the ACK that acknowledges the whole LW), the TCP module 314 of the source node 310 will compare the value of the counter with the threshold to judge the reason of packet loss.

(3) When the packet loss is due to BER, the TCP module 314 of the source node 310 will set the slow start threshold "Ssthresh" as follows:

Ssthresh=Max (CWND, (Ssthresh+CWND)/2), wherein the values of the congestion window "CWND" and the slow start threshold "Ssthresh" are the values previously recorded.

This way the TCP module 314 of the source node 310 would come into the state of Slow-Start, and would recover to its original speed much more quickly than current TCP flow control and congestion control mechanisms, such as Reno (FRFR) algorithms and modifications of Reno (FRFR) algorithm, as described with reference to FIG. 2.

The Fast Recovery Plus (FR+) algorithm according to an embodiment of the present invention is independent and may cooperate with most of the TCP flow control and congestion avoidance mechanisms, such as Reno (FRFR) algorithms as described in RFC 2581, TCP Selective Acknowledgment (SACK) algorithms as described in RFC 2018, and FACK algorithms and so on. If the Fast Recovery Plus (FR+) algorithm is integrated into, or cooperates with Reno/NewReno algorithms in which both timeout and duplicate ACKs indicate packet loss, the five steps as described in RFC 2581 and RFC 2582 may be modified as follows:

First, a counter is added or included in the TCP module 314 of the source node 310 to record the retransmit times, which is reset to "0" while the Reno (FRFR) algorithm is invoked. In addition, the TCP module 314 of the source node 310 is also configured to record the congestion window "CWND", the slow start threshold "Ssthresh" and the current maximal sequence number "SN" that has been sent into the network.

Second, when the FRFR algorithm is in operation, the counter records the total times of packet retransfer invoked by both duplicate ACKs and timeout.

When the ACK that acknowledges the whole LOSS window "LW" arrives, the TCP module 314 of the source node 310 determines the reason of packet loss. If the packet loss is due to sporadic BER, the TCP module 314 of the source node 310 sets the slow start threshold "Ssthresh" to Max (CWND, (Ssthresh+CWND)/2), wherein the values of the congestion window "CWND" and the slow start threshold "Ssthresh" are the values previously recorded. Then the TCP module 314 of the source node 310 exits the Fast Recovery Plus (FR+) algorithm.

The NewReno algorithm as described in RFC 2582 introduces a new concept of a "Partial ACK", which is more efficient when multiple packet losses occur in one window of data. Therefore, when the Fast Recovery Plus (FR+) algorithm according to an embodiment of the present invention is integrated into, or cooperates with the NewReno algorithm, the only difference is that retransfer may be invoked by duplicate ACKs, timeout and "Partial ACK". If the Fast Recovery Plus (FR+) algorithm according to an embodiment of the present invention is integrated into, or cooperates with other existing TCP flow control and congestion avoidance mechanisms, such as TCP Selective Acknowledgment (SACK) as described in RFC 2018, and FACK and so on, slight modifications may be required to obtain high data throughput. This is because most TCP flow control and congestion avoidance mechanisms, including SACK and FACK employ different algorithms to indicate packet loss in the TCP/IP network.

Figure 4:
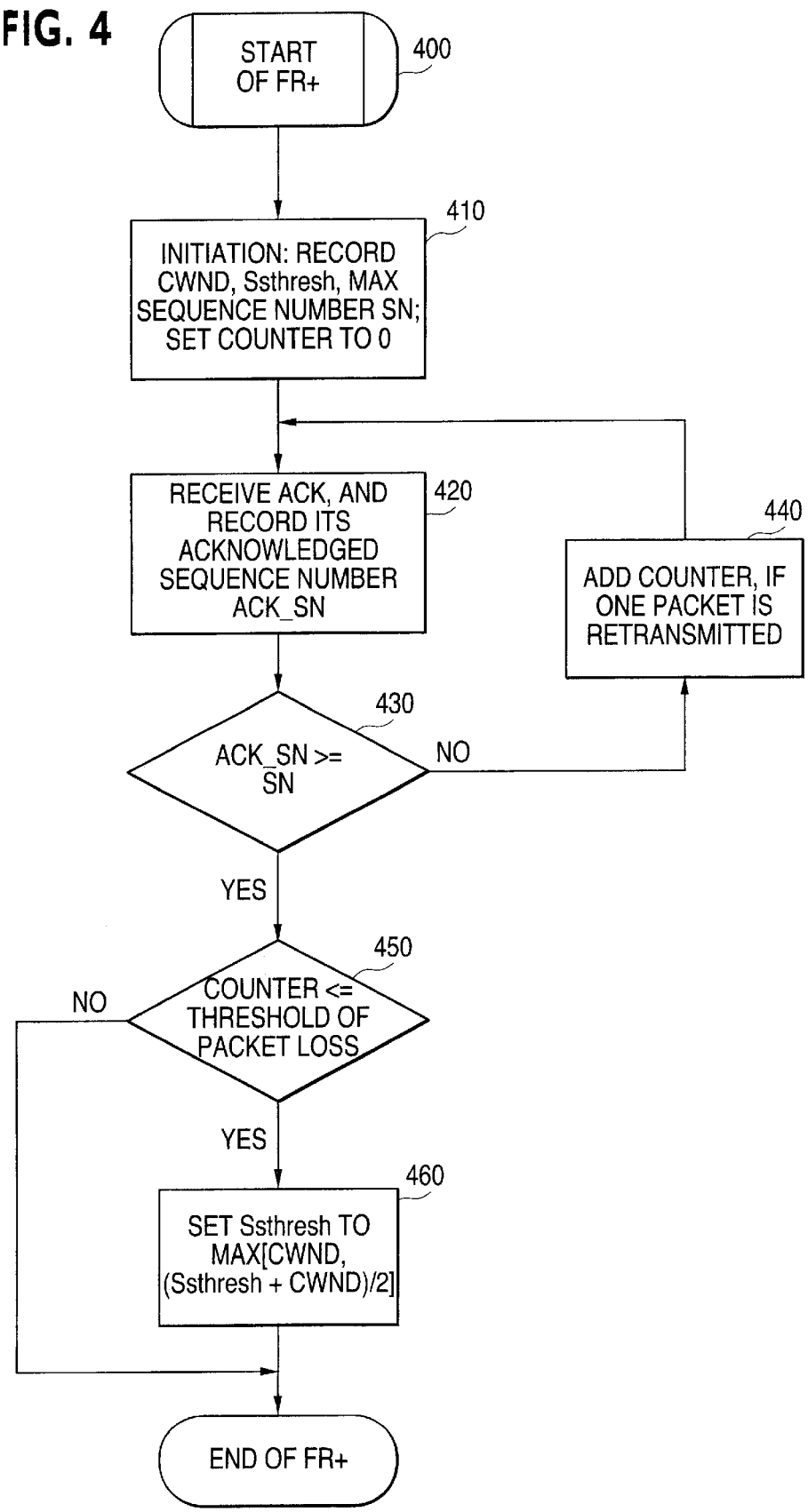
FIG. 4 is a flowchart representation of an advanced Fast Recovery Plus (FR+) mechanism according to an embodiment of the present invention.

FIG. 4 illustrates a flowchart of the Fast Recovery Plus (FR+) algorithm installed in the TCP module 314 of the source node 310 according to an embodiment of the present invention. As shown in FIG. 4, the Fast Recovery Plus (FR+) algorithm is invoked at block 400, when the TCP module 314 of the source node 310 receives three (3) duplicate ACKs from the TCP module 324 of the destination node 320, and treats the arrival of the third duplicate ACKs (4 identical ACKs without the arrival of any other intervening packets) as an indication that a data segment has been lost. Alternatively, the Fast Recovery Plus (FR+) algorithm can also be invoked at block 400, when a TimeOut occurs (if TimeOut is used to detect packet loss). Next, the TCP module 314 of the source node 310 sets the counter to "0", and records the congestion window "CWND", the slow start threshold "Ssthresh", and the current maximal sequence number "SN" that has been sent into the TCP/IP network 300 at block 410. The set "Ssthresh" should be no more than the value "Ssthresh"=max (FlightSize/2, 2*SMSS), wherein the FlightSize is the amount of outstanding data in the TCP/IP network 300, and SMSS is the size of the largest data segment that the TCP module 314 of the source node 310 can transmit.

At block 410, the TCP module 314 of the source node 310 also detects packet loss, resets the congestion window "CWND", doubles the TimeOut value, and retransmits the lost packet.

At block 420, the TCP module 314 of the source node 310 receives another duplicate ACK, and acknowledges its maximal sequence number ACK_SN. When the ACK_SN is not greater than or equal to the recorded maximal sequence number SN, the TCP module 314 of the source node 310 increases the counter by "1" and retransmits the lost packet at block 440. However, if the ACK_SN is greater than or equal to the recorded maximal sequence number SN, the TCP module 314 of the source node 310 determines if the value of the counter is less than or equal to the pre-defined packet threshold (threshold of packet loss), that is, if the packet loss is due to BER at block 450.

If the value of the counter is less than or equal to (or no more than) the pre-defined packet threshold (threshold of packet loss) at block 450, then the TCP module 314 of the source node 310 sets the slow start threshold "Ssthresh" to Max (CWND, (Ssthresh+CWND)/2) at block 460, and then exits the Fast Recovery Plus (FR+) algorithm at block 470. However, if the counter value is not less than or equal to the pre-defined packet threshold (threshold of the packet loss) at block 450, the TCP module 314 of the source node 310 exits the Fast Recovery Plus (FR+) algorithm at block 470.

Alternatively, at block 410, the TCP module 314 of the source node 310 also re-transmits the lost packet and sets the congestion window "CWND" to "Ssthresh" plus 3*SMSS, when the third duplicate ACK is received. This artificially "inflates" the congestion window "CWND" by the number of data packets (three) that have left the TCP/IP network 300 and which the TCP module 324 of the destination node 310 has buffered. For each additional duplicate ACK received, the TCP module 314 of the source node 310 increments the congestion window "CWND" by SMSS so as to artificially "inflate" the congestion window "CWND" to reflect the additional segment that has left the TCP/IP network 300. The TCP module 314 of the source node 310 then transmits a data packet, if allowed by the new value of the congestion window "CWND." When the next ACK arrives that acknowledges new data, the TCP module 314 sets the congestion window "CWND" to "Ssthresh", wherein "Ssthresh" is set to Max (CWND, (Ssthresh+CWND)/2).

The TCP module 314 of the source node 310 next determines if the value of the counter is less than or equal to the pre-defined packet threshold (threshold of packet loss) at block 450, and then proceeds to block 460 to set the slow start threshold "Ssthresh" to Max (CWND, (Ssthresh+ CWND)/2), and then to block 470 to exit the Fast Recovery Plus (FR+) algorithm. This way the TCP module 314 of the source node 310 does not need to reduce the congestion window CWND to slow down the sending speed (transmission rate) and can recover to its original sending speed very quickly.

However, if the value of the counter is more than the pre-defined packet threshold (threshold of packet loss), the TCP module 314 of the source node 310 exits the Fast Recovery Plus (FR+) algorithm at block 470. The TCP module 314 of the source node 310 then treats packet loss as an indication of congestion, and acts as normal TCP to avoid congestion in the network, including, for example, reducing the congestion window CWND to half, and the slow start threshold Ssthresh to the congestion window CWND in order to slow a transmission rate to avoid congestion in the network.

As a result, the Fast Recovery Plus (FR+) mechanism according to an embodiment of the present invention can maintain a high data throughput and enhance the efficiency when data packets overflow in the congested router. In addition, the recovery time can be avoided and the efficiency of TCP connection can be improved, which are especially suitable for noisy wireless networks since the congestion window "CWND" need not be reduced, and the state of Slow-Start need not be entered, if a data packet is lost due to BER. Moreover, the congestion control of the TCP module of the source node 310 and the destination node 320 can be simplified and easy to control.

Figure 5:
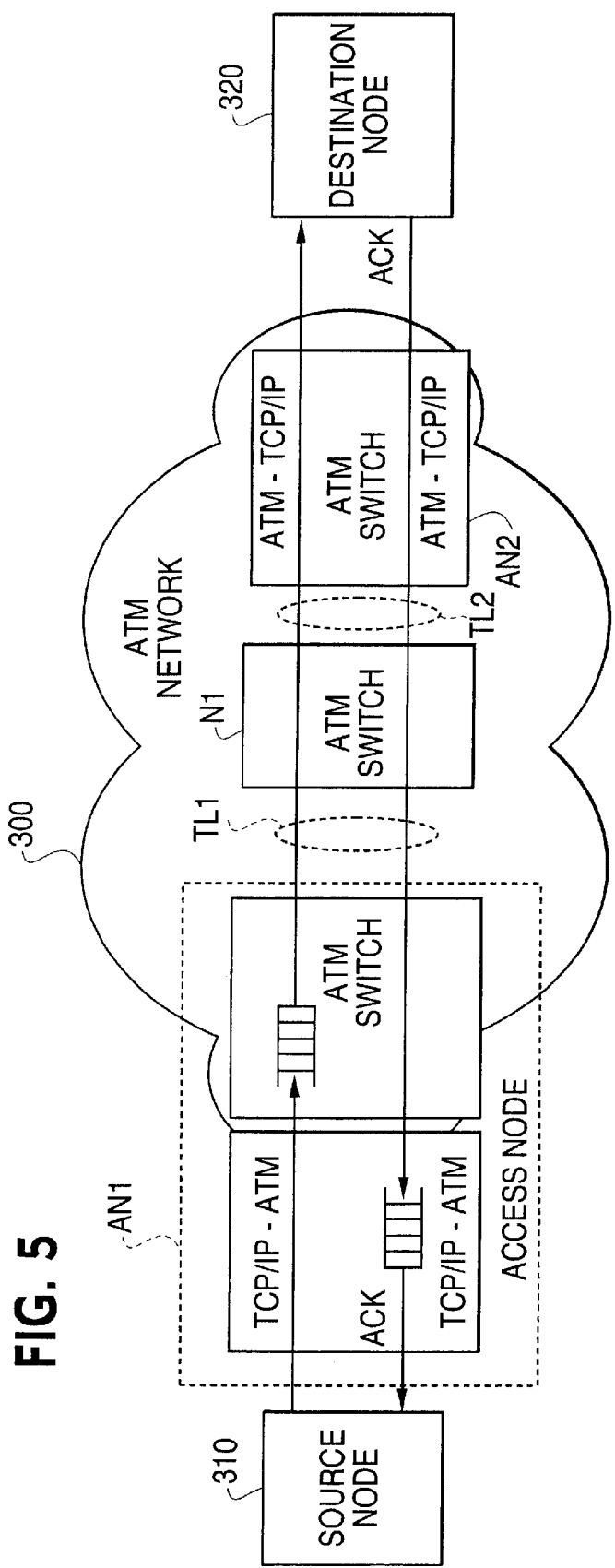
FIG. 5 illustrates one preferred usage implementation of a packet-switched network including an advanced Fast Recovery Plus (FR+) mechanism installed therein for controlling congestion according to an embodiment of the present invention.

FIG. 5 illustrates one preferred usage implementation of a packet-switched network including an improved Fast Recovery Plus (FR+) mechanism installed therein for flow control and congestion avoidance according to an embodiment of the present invention. The packet-switched network may correspond to a TCP over ATM (Asynchronous Transfer Mode) network. ATM is a connection-oriented packet-switching technique adopted by the International Telecommunication Standardization Organization (ITU-T) as backbones for the various parts of TCP/IP networks such as the Internet and wireless or mobile networks. As shown in FIG. 5, a connection between a source node 310 and a destination node 320 (two user terminals) in the TCP over ATM network 300 is shown, i.e. the user terminals using TCP as a transport layer protocol. In addition, two access nodes AN1 and AN2 of the user terminals, one intermediate node N1 and transmission (wire or wireless) lines TL1, TL2 connecting the access nodes are shown.

The Fast Recovery Plus (FR+) algorithm may be installed, or incorporated into each TCP module (not shown) of respective source node 310 and destination node 320 for flow control and congestion avoidance in the TCP over ATM network 300 in the same way as described with reference to FIG. 3 in order to efficiently improve the throughput of TCP connection of the TCP over ATM network 300.

Figure 6:
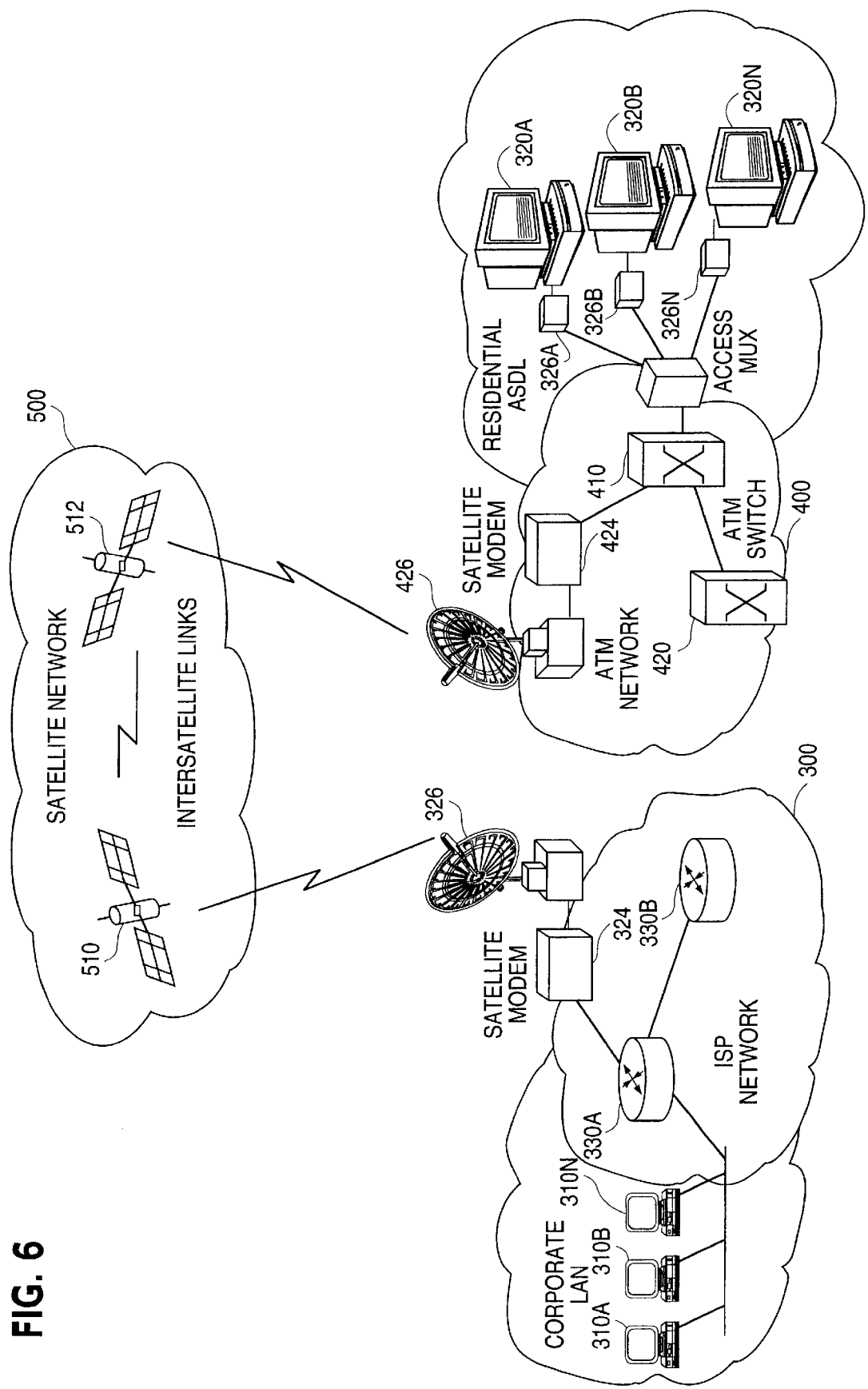
FIG. 6 illustrates another preferred usage implementation of a packet-switched network including an advanced Fast Recovery Plus (FR+) mechanism installed therein for controlling congestion according to an embodiment of the present invention.

FIG. 6 illustrates another preferred usage implementation of a packet-switched network including an improved Fast Recovery Plus (FR+) mechanism installed therein for flow control and congestion avoidance according to an embodiment of the present invention. As shown in FIG. 6, the packet-switched network may correspond to a TCP over ISF network 300, ATM network 400 and a satellite network 500. The ISF network 300 may include several intermediate nodes (routers or communication gateways) 330A–330B, a satellite modem 324 and a transceiver 326. The ATM network 400 may include several ATM switches 410, 412, a satellite modem 424 and a transceiver 426 which interacts with the ISF network 300, via the satellite network 500 including at least a pair of satellites 510, 512. The source node 310A–310N may be selected from a corporate local area network (LAN) for sending/receiving data packets, via the ISF network 300. Likewise, the destination node 320A–320N may be selected from a residential ASDL for sending/receiving data packets, via the ATM network 400. The Fast Recovery Plus (FR+) algorithm as described with reference to FIG. 3 may be incorporated into the enhanced TCP module (not shown) of respective source node 310A–310N and destination node 320A–320N to efficiently improve the throughput of TCP connection of the TCP over ISF network 300, ATM network 400 and a satellite network 500. Once installed in the TCP over ISF network 300, ATM network 400 and a satellite network 500, the Fast Recovery Plus (FR+) algorithm as described with reference to FIG. 3 can maintain a high data throughput and enhance the efficiency when data packets overflow in the congested routers, while minimizing the high packet loss rate and the number of congestions in the network.

The followings are Single-Connection Simulations and Multiple-Connection Simulations of the Fast Recovery Plus (FR+) algorithm when compared with the existing Reno (FRFR) algorithm. Reno (FRFR) algorithm is selected from all TCP flow control and congestion avoidance algorithms for both Single-Connection Simulations and Multiple-Connection Simulations, since it is the most efficient congestion control algorithm available for wireless network applications.

Figure 7:
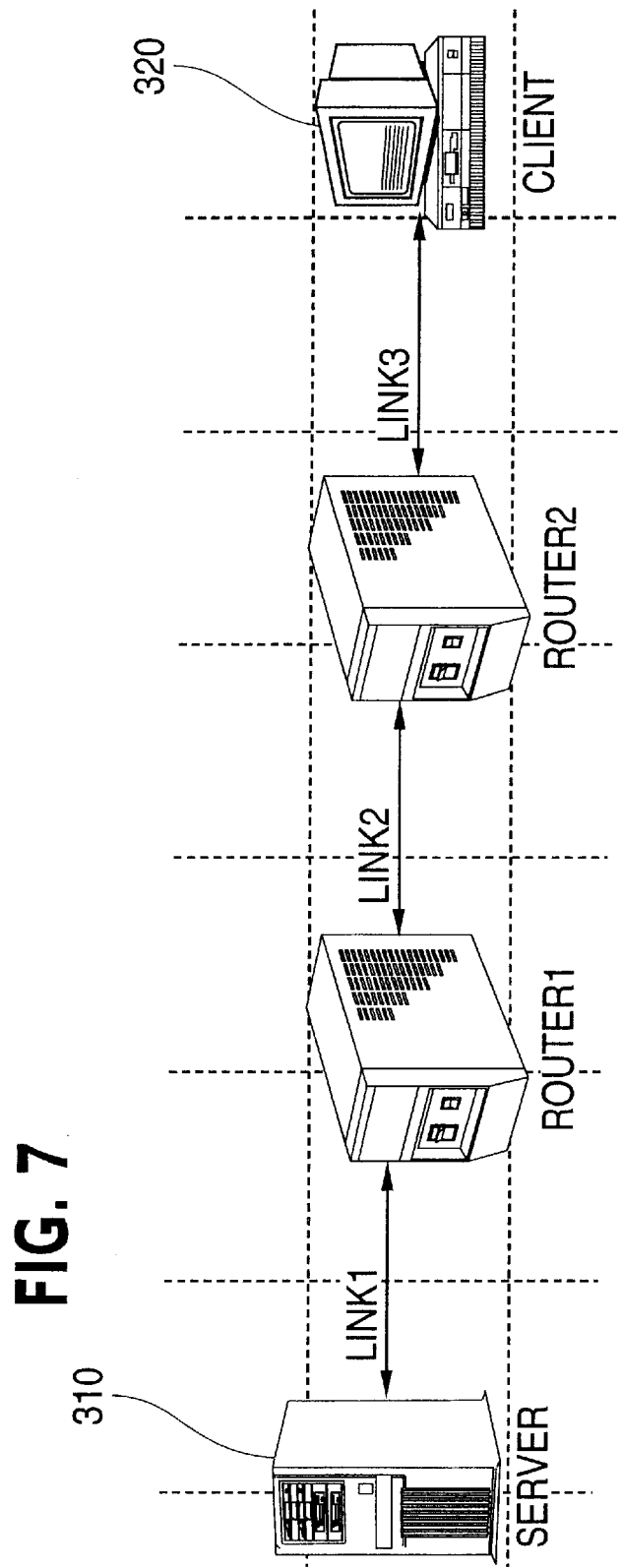
FIG. 7 illustrates a single connection network for comparison simulations of an example Reno (FRFR) algorithm and an advanced Fast Recovery Plus (FR+) algorithm.

I. Single-Connection Simulations of Fast Recovery Plus (FR+) Algorithm:

For purposes of illustration, FIG. 7 provides a topological structure of a single connection network which is used to compare the existing Reno (FRFR) algorithm and the Fast Recovery Plus (FR+) algorithm according to an embodiment of the present invention using the same parameters in a TCP/IP network. As shown in FIG. 7, the TCP/IP network includes a source node 310, a destination node 320 and router1 and router2. The source node 310 may correspond to a Server, and the destination node 320 may correspond to a Client.

1) For Simulation in Low-Speed Links Without Congestion
The following parameters are used:
Link1 is 200 Kbps in link rate and 5 ms in link delay.
Link2 is 2 Mbps in link rate and 200 ms in link delay.
Link3 is 200 Kbps in link rate and 5 ms in link delay, with $BER=10^{-6}$.

In this simulation, the source node (Server) 310 and the destination node (Client) 320 of the single connection network shown in FIG. 7 are connected, via low-speed links. The two routers (Router1 and Router2) have enough buffers and their speeds are high enough such that no congestion may occur. In addition, the source node (Server) 310 and the destination node (Client) 320 have the following common attributes: IP Forwarding Rate is 10,000 packets/s; the maximal round-trip TIMEOUT "RTO" is 5 seconds; the minimal RTO is 0.4 seconds; receive buffer is 65535 bytes; data packets should be promoted at once; ACK delay time is 0 and the maximal TCP data packet length is 536 bytes.

In addition, the rates of Link1 and Link3 are only 200 Kbps together. So data packets may be piled at TCP source node (Server) 310. In addition no congestion occurs in the simulation. During the simulation, there is only an FTP-connection from the source node (Server) 310 to destination node (Client) 320. The downloaded file is long enough to transfer until the simulation ends.

Figure 10:
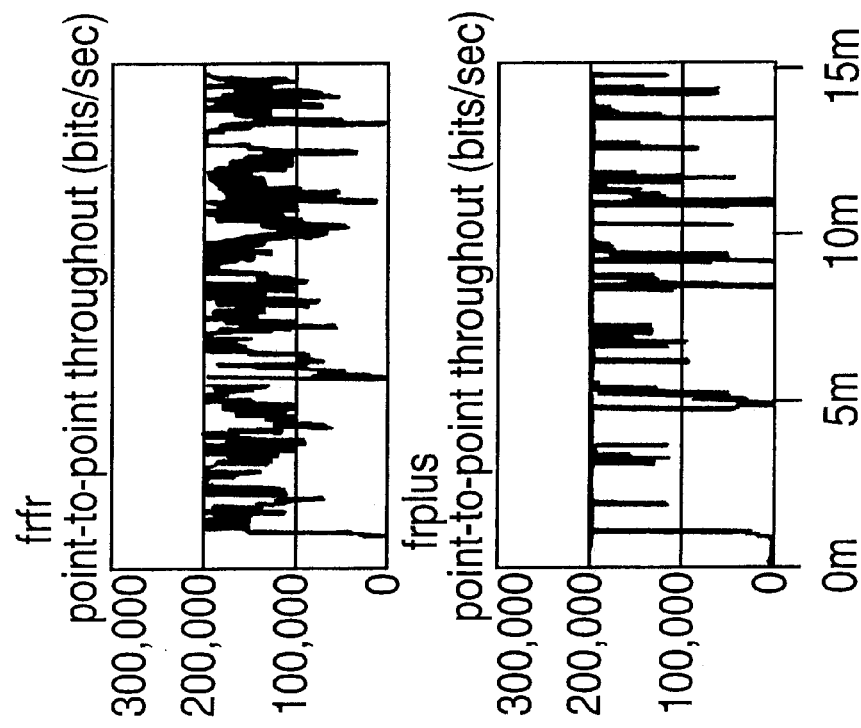
FIGS. 10A–10B illustrate simulation results in terms of the Utilization of Link of the single connection network executing the Reno (FRFR) algorithm and the advanced Fast Recovery Plus (FR+) algorithm in low-speed links without congestion.
Figure 9:
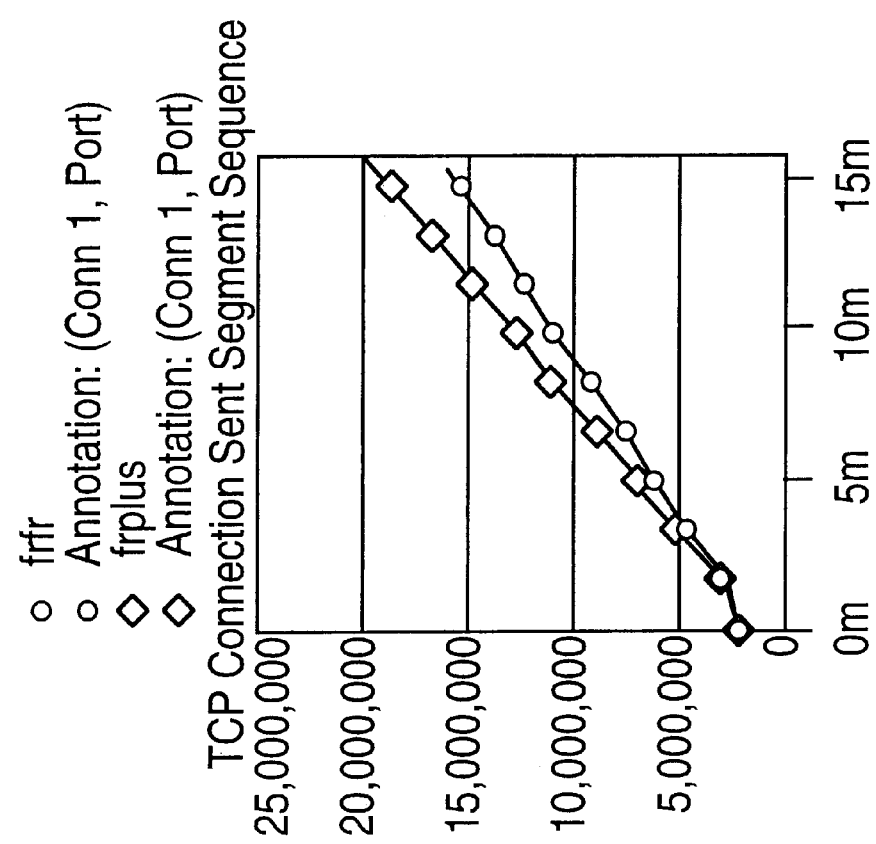
FIG. 9 illustrates simulation results in terms of the TCP Sequence Number "SN" of the single connection network executing the Reno (FRFR) algorithm and the advanced Fast Recovery Plus (FR+) algorithm in low-speed links without congestion.

In the following, the comparisons of the Reno (FRFR) algorithm and the Fast Recovery Plus (FR+) algorithm are shown in terms of the congestion window "CWND" as shown in FIGS. 8A–8B, sending TCP Sequence Number "SN" as shown in FIG. 9, and the Utilization of the Link between the source node (Server) 310 and Router1 as shown in FIGS. 10A–10B.

Specifically, FIGS. 8A–8B illustrate simulation results in terms of the congestion window CWND of a single connection network executing Reno (FRFR) algorithm and Fast Recovery Plus (FR+) algorithm in low-speed links without congestion. FIG. 8A shows the congestion window CWND of the connection (Y-axis) as a function of time (X-axis) when executing Reno (FRFR) algorithm. FIG. 8B shows the congestion window CWND of the connection (Y-axis) as a function of time (X-axis) when executing Fast Recovery Plus (FR+) algorithm according to an embodiment of the present invention.

FIG. 9 illustrates simulation results in terms of the TCP Sequence Number of a single connection network executing Reno (FRFR) algorithm and Fast Recovery Plus (FR+) algorithm in low-speed links without congestion.

FIGS. 10A–10B illustrate simulation results in terms of the Utilization of Link of a single connection network executing Reno (FRFR) algorithm and Fast Recovery Plus (FR+) algorithm in low-speed links without congestion. FIG. 10A shows the Utilization of Link between Server and Router1 (Y-axis) as a function of time (X-axis) when executing Reno (FRFR) algorithm. FIG. 10B shows the Utilization of Link between Server and Router1 as a function of time (X-axis) when executing Fast Recovery Plus (FR+) algorithm according to an embodiment of the present invention.

During simulations, the Fast Recovery Plus (FR+) algorithm has been called 140 times together, with no packet loss in the next data window 107 times, with one packet loss 27 times, with 2 or more packets lost 6 times. In addition, there are 6 TIMEOUT.

When the speed of link is the bottleneck of the single connection, the advantage of the Fast Recovery Plus (FR+) algorithm of the present invention is not very obvious. Even that, the data throughput of Fast Recovery Plus (FR+) algorithm is 17% more than that of the FRFR algorithm. The reason is that after re-transmitting the lost packet, the TCP module (not shown in FIG. 7) of the source node 310 can recover to the original speed sooner than FRFR algorithm. During retransmission, more new data can be sent out because the congestion window "CWND" of Fast Recovery Plus (FR+) algorithm is bigger than that of FRFR algorithm.

2) For Simulation in High-Speed Links Without Congestion

The following parameters are used:

Link1 is 2 Mbps in link rate.

Link2 is 10 Mbps in link rate.

Link3 is 2 Mbps in link rate.

In this simulation, the source node (Server) 310 and the destination node (Client) 320 of the single connection network shown in FIG. 7 are connected, via high-speed links.

Figure 11A:
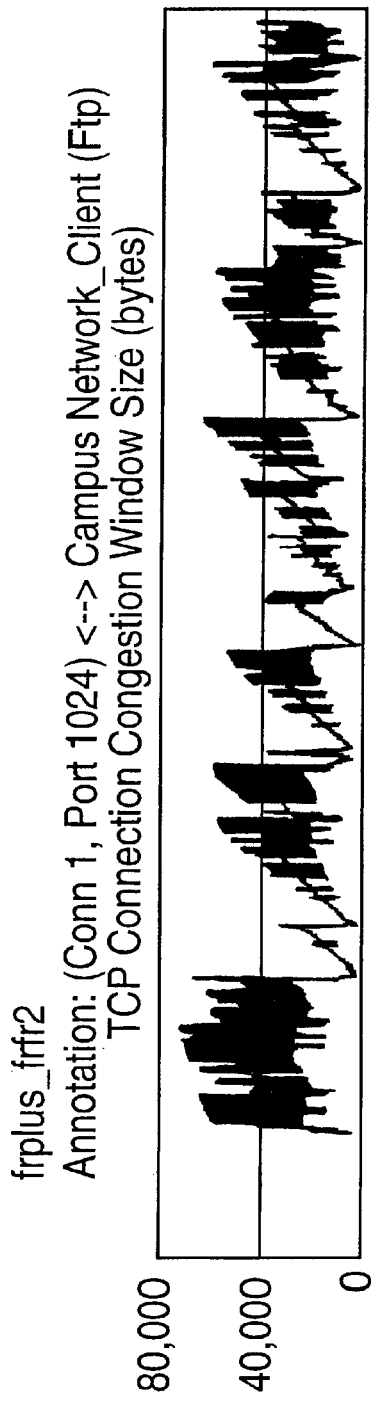
FIGS. 11A–11B illustrate simulation results in terms of the congestion window "CWND" of the single connection network executing the Reno (FRFR) algorithm and the advanced Fast Recovery Plus (FR+) algorithm in high-speed links without congestion.
Figure 11B:
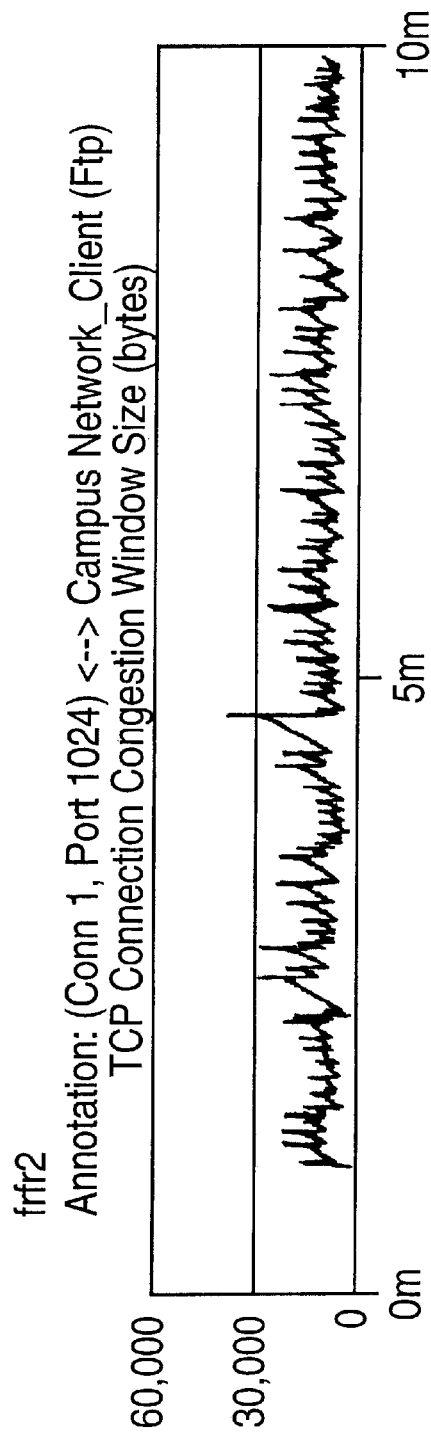
Figure 13A:
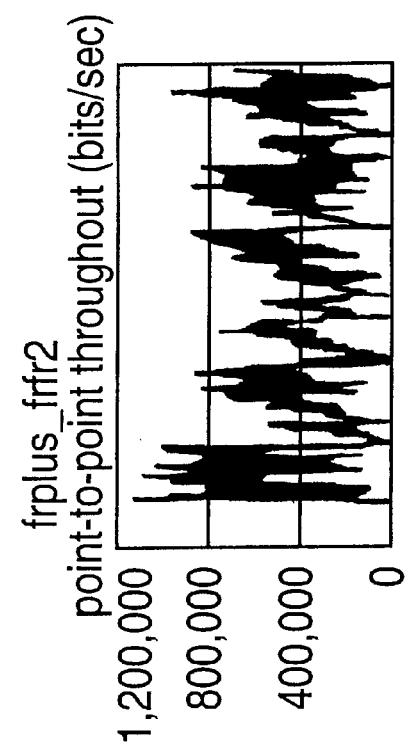
FIGS. 13A–13B illustrate simulation results in terms of the Utilization of Link of the single connection network executing the Reno (FRFR) algorithm and the advanced Fast Recovery Plus (FR+) algorithm in high-speed links without congestion.
Figure 13B:
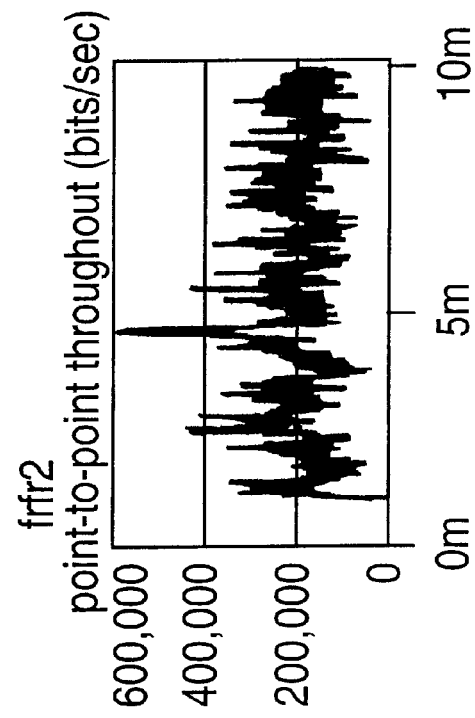
Figure 12:
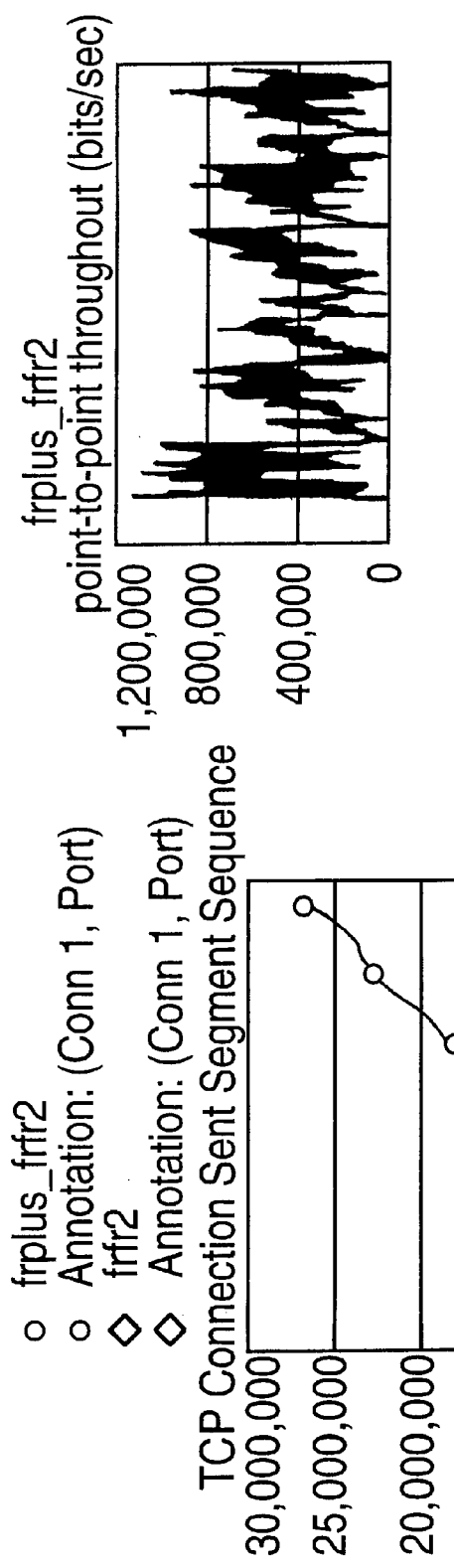
FIG. 12 illustrates simulation results in terms of the TCP Sequence Number "SN" of the single connection network executing the Reno (FRFR) algorithm and the advanced Fast Recovery Plus (FR+) algorithm in high-speed links without congestion.

In the following, the comparisons of the Reno (FRFR) algorithm and the Fast Recovery Plus (FR+) algorithm are shown in terms of the congestion window "CWND" as shown in FIGS. 11A–11B, sending TCP Sequence Number "SN" as shown in FIG. 12, and the Utilization of the Link between the source node (Server) 310 and Router1 as shown in FIGS. 13A–13B.

Specifically, FIGS. 11A–11B illustrate simulation results in terms of the congestion window CWND of a single connection network executing Reno (FRFR) algorithm and Fast Recovery Plus (FR+) algorithm in high-speed links without congestion. FIG. 11A shows the congestion window CWND of the connection (Y-axis) as a function of time (X-axis) when executing Fast Recovery Plus (FR+) algorithm according to an embodiment of the present invention. FIG. 11B shows the congestion window CWND of the connection (Y-axis) as a function of time (X-axis) when executing Reno (FRFR) algorithm.

FIG. 12 illustrates simulation results in terms of the TCP Sequence Number of a single connection network executing Reno (FRFR) algorithm and Fast Recovery Plus (FR+) algorithm in high-speed links without congestion.

FIGS. 13A–13B illustrate simulation results in terms of the Utilization of Link of a single connection network executing Reno (FRFR) algorithm and Fast Recovery Plus (FR+) algorithm in high-speed links without congestion. FIG. 13A shows the Utilization of Link between Server and Router1 (Y-axis) as a function of time (X-axis) when executing Fast Recovery Plus (FR+) algorithm according to an embodiment of the present invention. FIG. 13B shows the Utilization of Link between Server and Router1 as a function of time (X-axis) when executing Reno (FRFR) algorithm.

During simulations, the Fast Recovery Plus (FR+) algorithm has been called 176 times together, with no packet loss in the next data window 139 times, with one packet loss 29 times, with 2 or more packet loss 8 times. In addition, there are 10 TIMEOUT.

When the speed of link is high enough, the performance of TCP connection of the Fast Recovery Plus (FR+) algorithm is dramatically improved over that of the FRFR algorithm. By increasing the value of Ssthresh when packet loss, Fast Recovery Plus (FR+) algorithm succeeds to recover the congestion window "CWND" very quickly. The value of CWND of Fast Recovery Plus (FR+) algorithm is as almost twice as that of pure FRFR algorithm. That is why Fast Recovery Plus (FR+) algorithm is much more efficient than pure FRFR algorithm.

3) For Simulation in High-Speed Links With Congestion

In this simulation, all parameters in the last simulation are used, except the configuration of Router2. Router2 is designed as a low-speed router with IP forwarding rate 190 packet/s, and maximal 50 packets in its buffer.

Figure 14A:
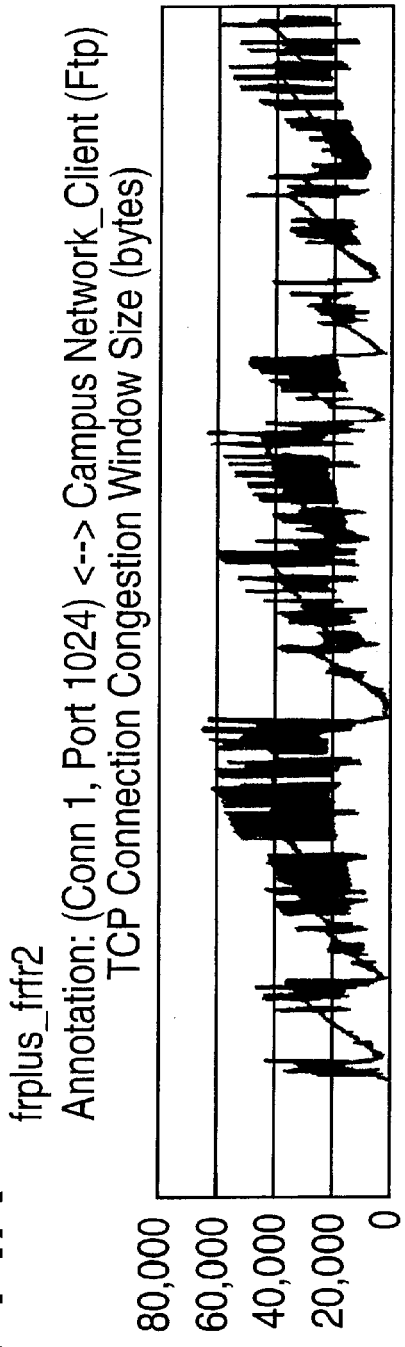
FIGS. 14A–14B illustrate simulation results in terms of the congestion window "CWND" of the single connection network executing the Reno (FRFR) algorithm and the advanced Fast Recovery Plus (FR+) algorithm in high-speed links with congestion.
Figure 14B:
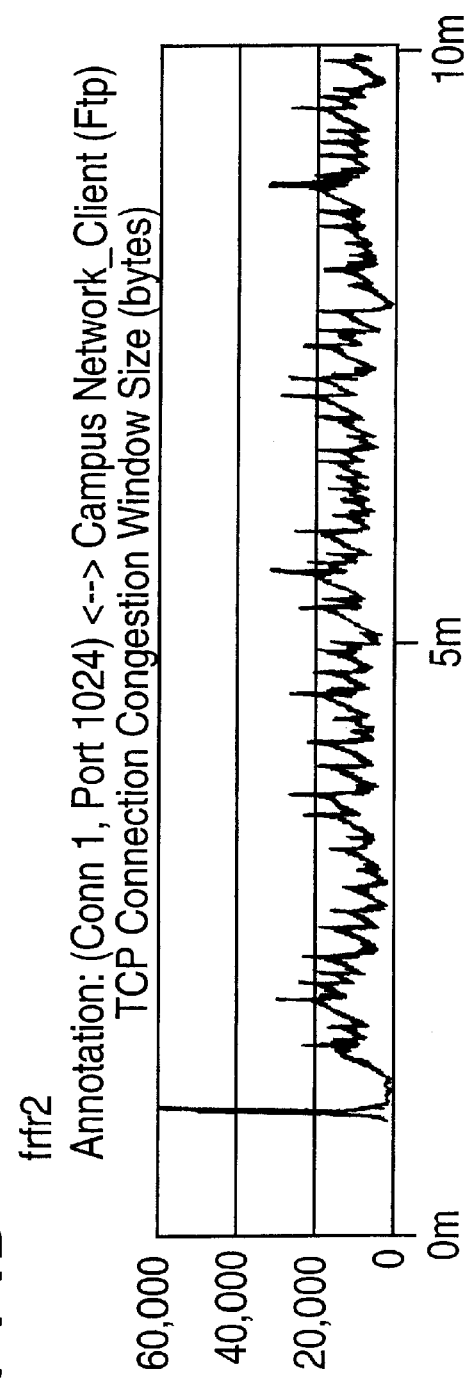
Figure 15:
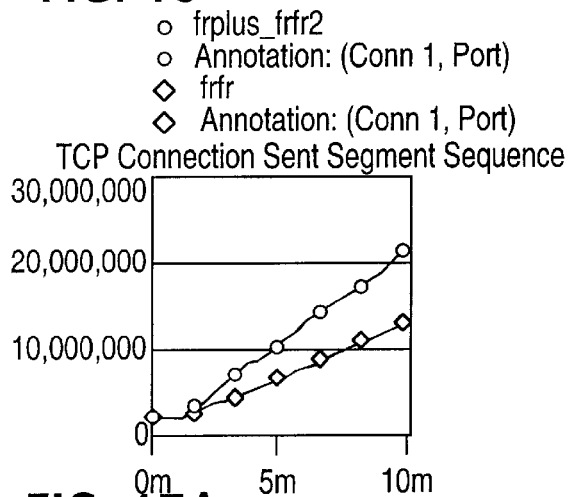
FIG. 15 illustrates simulation results in terms of the TCP Sequence Number "SN" of the single connection network executing the Reno (FRFR) algorithm and the advanced Fast Recovery Plus (FR+) algorithm in high-speed links with congestion.
Figure 16:
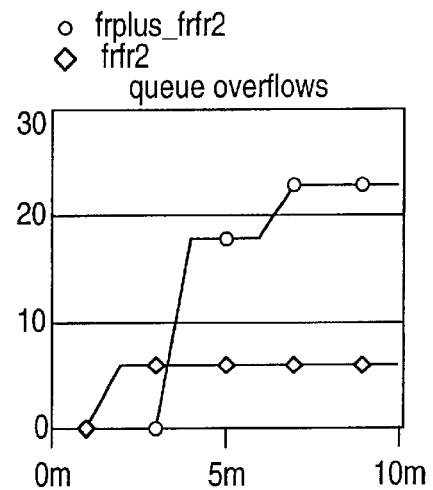
FIG. 16 illustrates simulation results in terms of TCP data overflow of the single connection network executing the Reno (FRFR) algorithm and the advanced Fast Recovery Plus (FR+) algorithm in high-speed links with congestion.
Figure 17A:
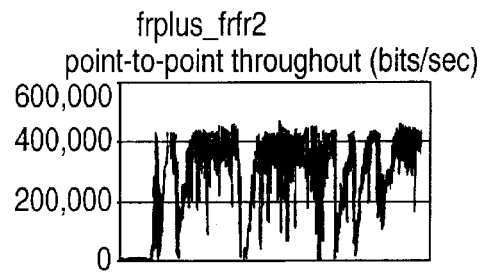
FIGS. 17A–17B illustrate simulation results in terms of the Utilization of Link of the single connection network executing the Reno (FRFR) algorithm and the advanced Fast Recovery Plus (FR+) algorithm in high-speed links with congestion.
Figure 18A:
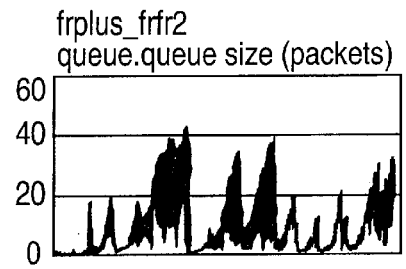
FIGS. 18A–18B illustrate simulation results in terms of the Queue Size in the Router of the single connection network executing the Reno (FRFR) algorithm and the advanced Fast Recovery Plus (FR+) algorithm in high-speed links with congestion.
Figure 17B:
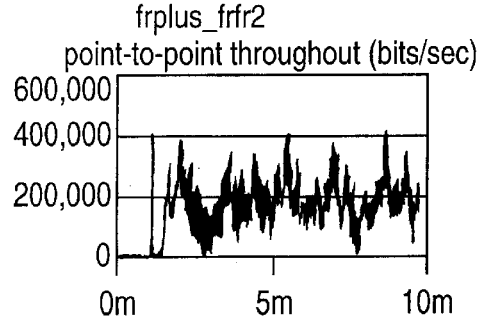
Figure 18B:
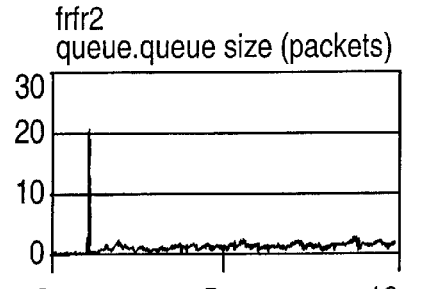

In the following, the comparisons of the Reno (FRFR) algorithm and the Fast Recovery Plus (FR+) algorithm are shown in terms of the congestion window "CWND" as shown in FIGS. 14A–14B, sending TCP Sequence Number "SN" as shown in FIG. 15, data overflow as shown in FIG. 16, the Utilization of the Link between the source node (Server) 310 and Router1 as shown in FIGS. 17A–17B, and the Queue Size in the Router as shown in FIGS. 18A–18B.

Specifically, FIGS. 14A–14B illustrate simulation results in terms of the congestion window CWND of a single connection network executing Reno (FRFR) algorithm and Fast Recovery Plus (FR+) algorithm in high-speed links with congestion. FIG. 14A shows the congestion window CWND of the connection (Y-axis) as a function of time (X-axis) when executing Fast Recovery Plus (FR+) algorithm according to an embodiment of the present invention. FIG. 14B shows the congestion window CWND of the connection (Y-axis) as a function of time (X-axis) when executing Reno (FRFR) algorithm.

FIG. 15 illustrates simulation results in terms of the TCP Sequence Number of a single connection network executing Reno (FRFR) algorithm and Fast Recovery Plus (FR+) algorithm in high-speed links with congestion.

FIG. 16 illustrates simulation results in terms of the data overflow of a single connection network executing Reno (FRFR) algorithm and Fast Recovery Plus (FR+) algorithm in high-speed links with congestion.

FIGS. 17A–17B illustrate simulation results in terms of the Utilization of Link of a single connection network executing Reno (FRFR) algorithm and Fast Recovery Plus (FR+) algorithm in high-speed links with congestion. FIG. 17A shows the Utilization of Link between Server and Router1 (Y-axis) as a function of time (X-axis) when executing Fast Recovery Plus (FR+) algorithm according to an embodiment of the present invention. FIG. 17B shows the Utilization of Link between Server and Router1 as a function of time (X-axis) when executing Reno (FRFR) algorithm.

FIGS. 18A–18B illustrate simulation results in terms of the Queue Size in the Router of a single connection network executing Reno (FRFR) algorithm and Fast Recovery Plus (FR+) algorithm in high-speed links with congestion. FIG. 18A shows the Queue Size in the Router (Y-axis) as a function of time (X-axis) when executing Fast Recovery Plus (FR+) algorithm according to an embodiment of the present invention. FIG. 18B shows the Queue Size in the Router as a function of time (X-axis) when executing Reno (FRFR) algorithm.

During simulations, Fast Recovery Plus (FR+) algorithm has been called 142 times together, with no packet loss in the next data window 113 times, with one packet loss 22 times, with 2 or more packet loss 7 times. In addition, there are 10 TIMEOUT.

In FIG. 16, congestion in FR+algorithm occurs twice. At the same time, TimeOut at the TCP source node 310 is observed, and at the same time, the congestion window CWND decreases very sharply, which means congestion is detected by the TCP sender. And the performance of FR+algorithm is still much better than that of FRFR.

4) Evaluation of Fast Recovery Plus (FR+) Algorithm in Single Connection

From these simulations, it can be observed that the Fast Recovery Plus (FR+) algorithm is very efficient in wireless networks with high transmission error. Moreover, regardless of whether the wireless network is either a high-speed network or a low-speed network, the data throughput of the Fast Recovery Plus (FR+) is much higher than FRFR algorithm. Even if there exists some congestion, FR+algorithm can detect the congestion and react as normal TCP.

II. Multiple-Connection Simulation of Fast Recovery Plus (FR+) Algorithm

Figure 19:
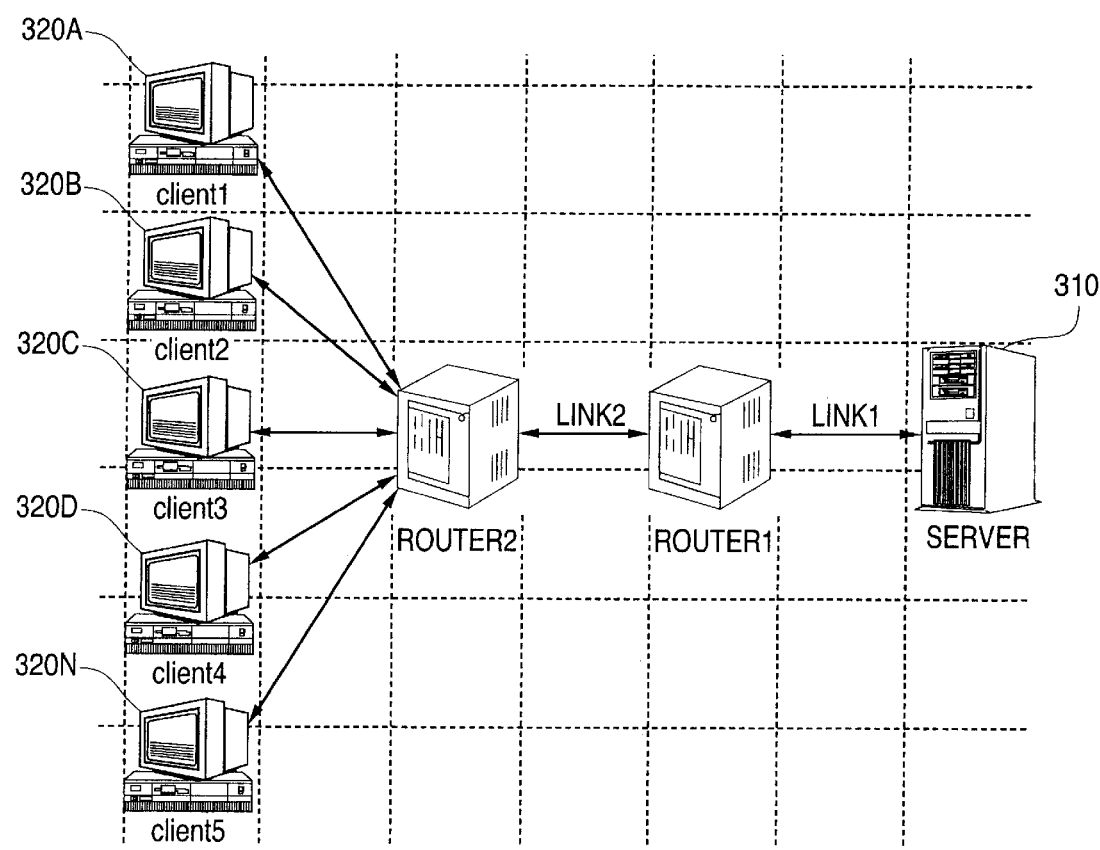
FIG. 19 illustrates a multiple connection network for comparison simulations of an example Reno (FRFR) algorithm and an advanced Fast Recovery Plus (FR+) algorithm.

For purposes of illustration, FIG. 19 provides a topological structure of a multiple connection network which is used to compare the existing Reno (FRFR) algorithm and the Fast Recovery Plus (FR+) algorithm according to an embodiment of the present invention using the same parameters in a TCP/IP network. As shown in FIG. 19, the TCP/IP network includes a source node (Server) 310, and a plurality of destination nodes (Clients) 320A–320N, via router1 and router2.

1) For Simulation in High-Speed Links Without Congestion

The following parameters are used:

Link1 is 2.5 Mbps in link rate and 5 ms in link delay.

Link2 is 10 Mbps in link rate and 200 ms in link delay.

Link3 is 500 Kbps in link rate and 5 ms in link delay, with BER=$10^{-6}$.

In this simulation, the source node (Server) 310A–310N and the destination node (Client) 320 of the multiple connection network shown in FIG. 19 are connected, via high-speed links. The two routers (Router1 and Router2) have enough buffers and their speeds are high enough such that no congestion may occur. In addition, the source node (Server) 310A–310N and the destination node 320 have the following common attributes: IP Forwarding Rate is 10,000 packets/s; the maximal RTO is 5 seconds; the minimal RTO is 0.4 seconds; receive buffer is 65535 bytes; packets should be promoted at once; ACK delay time is 0 and the maximal TCP data packet length is 536 bytes.

In this simulation, the rates of all links are high enough that no data is piled at TCP source node 310. And no congestion occurs in the simulation. During simulations, there is only an FTP-connection from the source node (Server) 310 to one (Client) of the destination nodes 31A–310N. The downloaded file is long enough to transfer until the simulation ends.

Figure 22A:
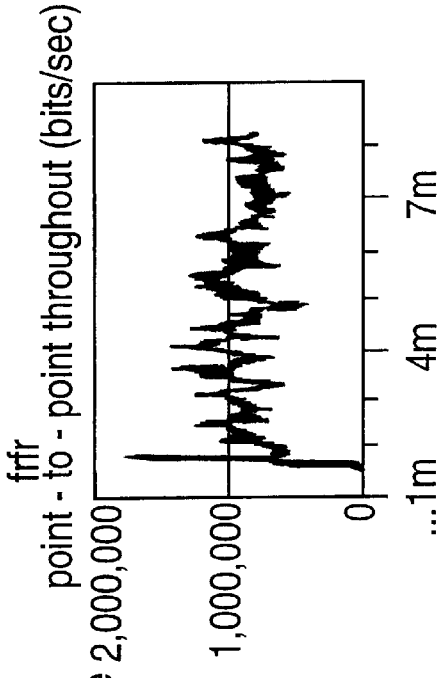
FIGS. 22A–22B illustrate simulation results in terms of the Utilization of Link of all connections executing the Reno (FRFR) algorithm and the advanced Fast Recovery Plus (FR+) algorithm in high-speed links without congestion.
Figure 22B:
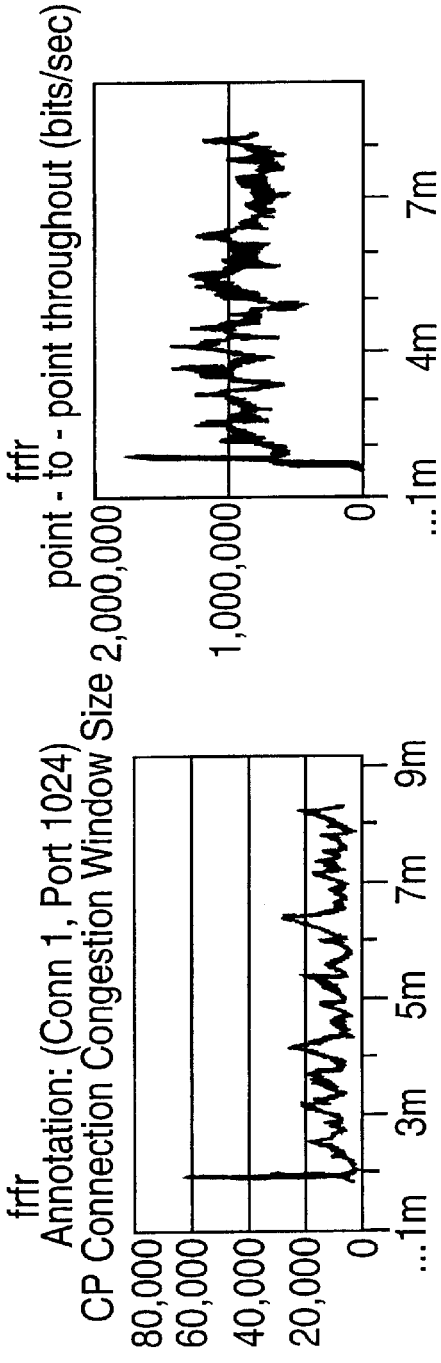
Figure 21A:
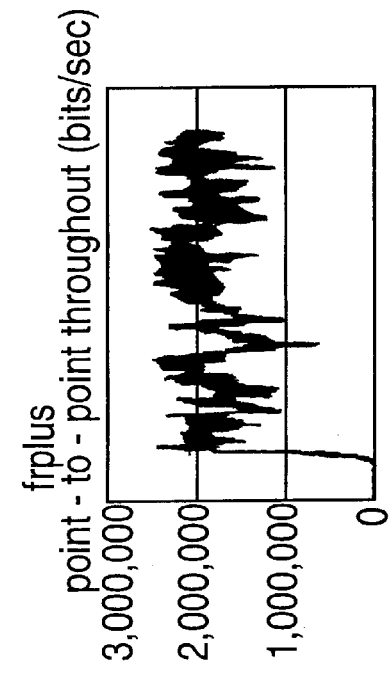
FIGS. 21A–21B illustrate simulation results in terms of the congestion window "CWND" of all connections executing the Reno (FRFR) algorithm and the advanced Fast Recovery Plus (FR+) algorithm in high-speed links without congestion.
Figure 21B:
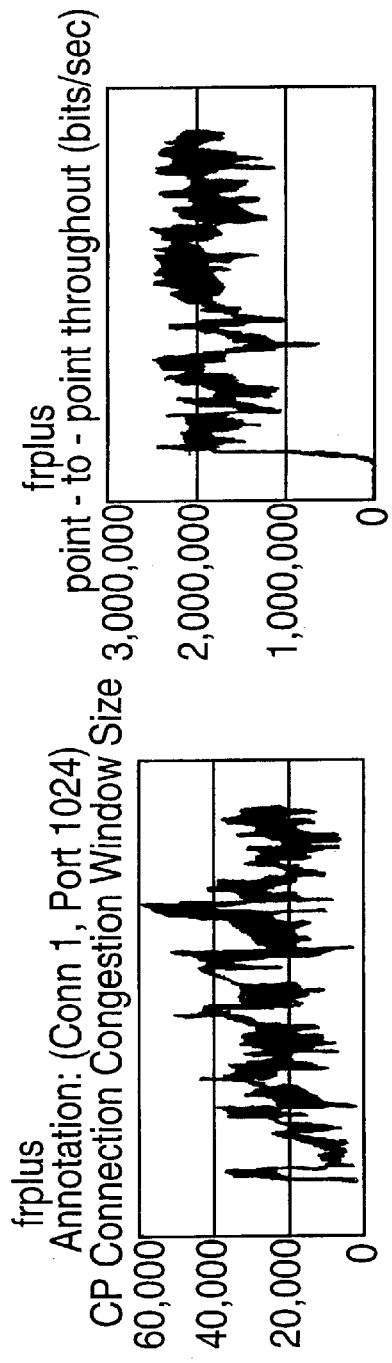

In the following, the comparisons of the Reno (FRFR) algorithm and the Fast Recovery Plus (FR+) algorithm are shown in terms of sending TCP Sequence Number "SN" as shown in FIG. 20, congestion window CWND of one connection as shown in FIGS. 21A–21B, and Utilization of the Link between the source node (Server) 310 and Router1 as shown in FIGS. 22A–22B.

Specifically, FIG. 20 illustrates a chart of simulation results in terms of the TCP Sequence Number of all connections in a multiple connection network executing Reno (FRFR) algorithm and Fast Recovery Plus (FR+) algorithm in high-speed links without congestion.

FIGS. 21A–21B illustrate simulation results in terms of the congestion window CWND of one connection in a multiple connection network executing Reno (FRFR) algorithm and Fast Recovery Plus (FR+) algorithm in high-speed links without congestion. FIG. 21 A shows the congestion window CWND of the connection (Y-axis) as a function of time (X-axis) when executing Fast Recovery Plus (FR+) algorithm according to an embodiment of the present invention. FIG. 21B shows the congestion window CWND of the connection (Y-axis) as a function of time (X-axis) when executing Reno (FRFR) algorithm.

FIGS. 22A–22B illustrate simulation results in terms of the Utilization of Link of one connection in a multiple connection network executing Reno (FRFR) algorithm and Fast Recovery Plus (FR+) algorithm in high-speed links without congestion. FIG. 22A shows the Utilization of Link between Server and Router1 (Y-axis) as a function of time (X-axis) when executing Fast Recovery Plus (FR+) algorithm according to an embodiment of the present invention. FIG. 22B shows the Utilization of Link between Server and Router1 as a function of time (X-axis) when executing Reno (FRFR) algorithm.

During simulations, FR+algorithm has been called 577 times together, with no packet loss in the next data window 457 times, with one packet loss 110 times, with 2 or more packet loss 10 times.

Similar to single connection, FR+algorithm has dramatically improved the performance of the TCP connections. By increasing the value of Ssthresh when packet loss, FR+succeeds to recover the congestion window CWND very quickly. The throughput of FR+is almost as twice as that of pure FRFR. That means FR+algorithm is much more efficient than pure FRFR algorithm.

Here, we introduce the calculation of fairness.

$$Fairness = \frac{\left(\sum_{i=1}^{n} b_i\right)^2}{n * \left(\sum_{i=1}^{n} b_i^2\right)}$$

The closer the value of F is to "1", the better is the fairness of algorithm. And the result is listed as:

$F_{FR+}$=99.86%

$F_{FRFR}$=99.83%

As can be seen, both FR+algorithm and FRFR algorithm are good at fairness.

2) For Simulation in High-Speed Links With Congestion

In this simulation, the source node (Server) 310 and the destination node (Client) 320 of the multiple connection network shown in FIG. 19 are connected, via high-speed links without congestion. The same network topological structure and the same parameters in the network are used, except Router2. The IP forwarding rate is 520 Packet/s, and the maximal buffer size is 200 packets. Some congestion may occur at Router2.

Figure 23:
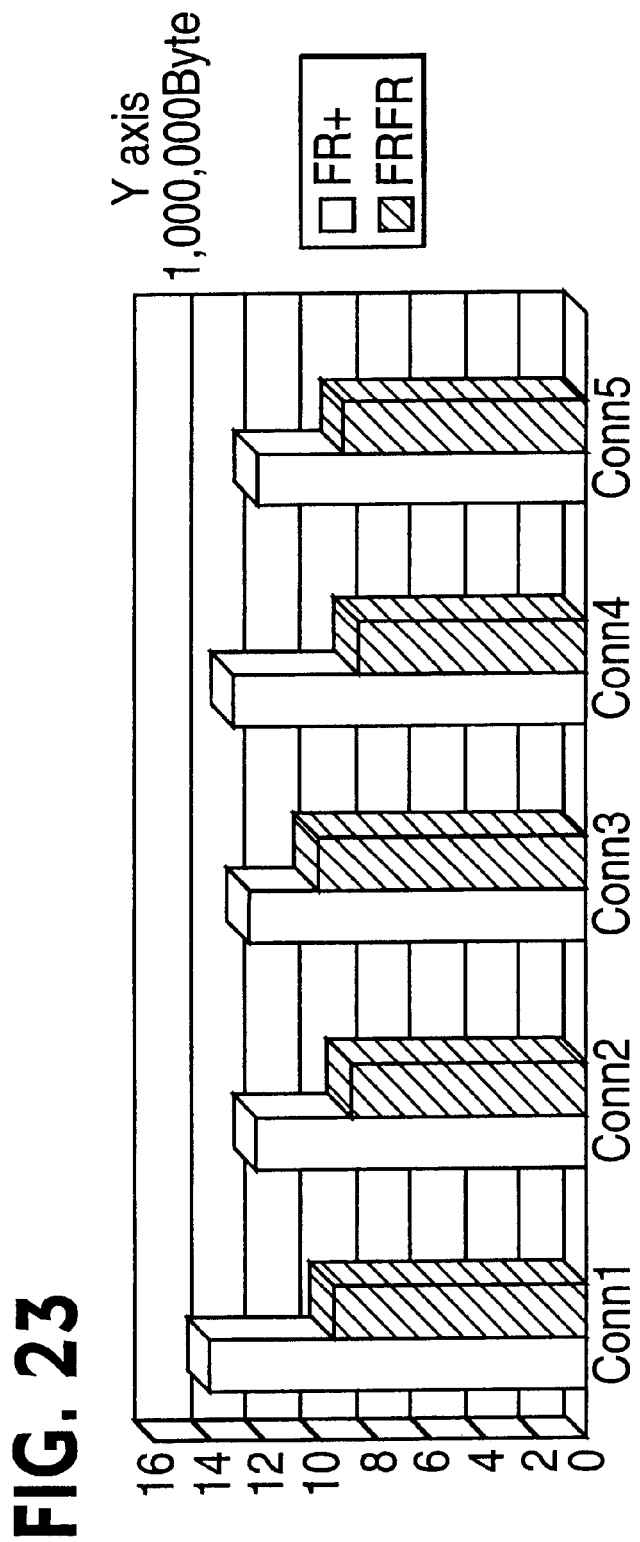
FIGS. 23A–23B illustrate simulation results in terms of the congestion window "CWND" of all connections in the multiple connection network executing the Reno (FRFR) algorithm and the advanced Fast Recovery Plus (FR+) algorithm in high-speed links with congestion.
Figure 25A:
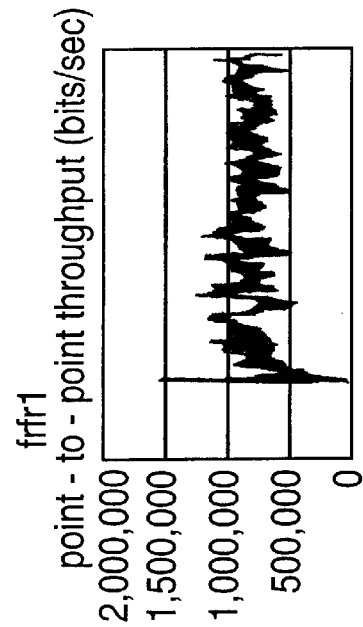
FIGS. 25A–25B illustrate simulation results in terms of the Utilization of Link of one connection in the multiple connection network executing the Reno (FRFR) algorithm and the advanced Fast Recovery Plus (FR+) algorithm in high-speed links with congestion.
Figure 25B:
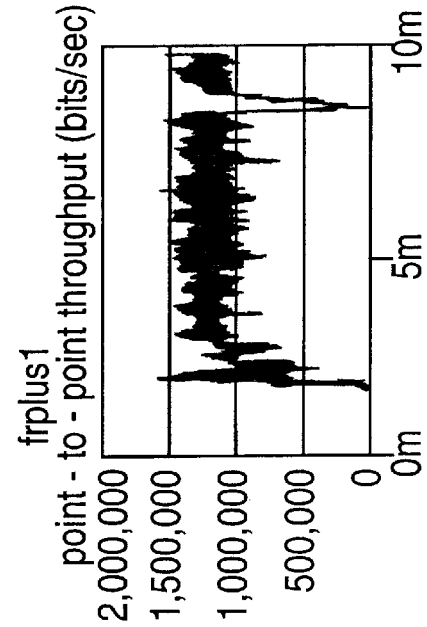
Figure 24A:
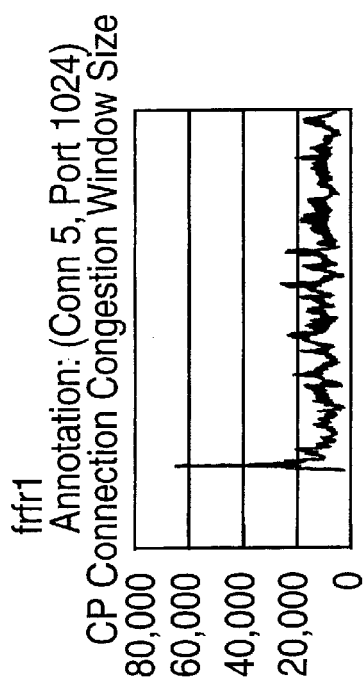
FIGS. 24A–24B illustrate simulation results in terms of the TCP Sequence Number "SN" of one connection of the multiple connection network executing the Reno (FRFR) algorithm and the advanced Fast Recovery Plus (FR+) algorithm in high-speed links with congestion.
Figure 24B:
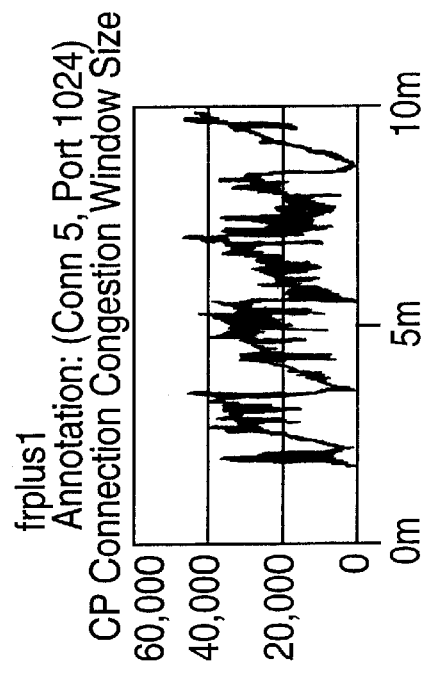

In the following, the comparisons of the Reno (FRFR) algorithm and the Fast Recovery Plus (FR+) algorithm are shown in terms of sending TCP Sequence Number "SN" of all connections as shown in FIG. 23, the congestion window "CWND" as shown in FIGS. 24A–24B, the Utilization of the Link between the source node (Server) 310 and Router1 as shown in FIGS. 25A–25B, the Queue Size in the Router as shown in FIGS. 26A–26B, and the data overflow as shown in FIG. 27.

Specifically, FIG. 23 illustrates a chart of simulation results in terms of the TCP Sequence Number of all connections in a multiple connection network executing Reno (FRFR) algorithm and Fast Recovery Plus (FR+) algorithm in high-speed links with congestion.

FIGS. 24A–24B illustrate simulation results in terms of the congestion window CWND of one connection in a multiple connection network executing Reno (FRFR) algorithm and Fast Recovery Plus (FR+) algorithm in high-speed links with congestion. FIG. 24A shows the congestion window CWND of the connection (Y-axis) as a function of time (X-axis) when executing Reno (FRFR) algorithm. FIG. 24B shows the congestion window CWND of the connection (Y-axis) as a function of time (X-axis) when executing Fast Recovery Plus (FR+) algorithm according to an embodiment of the present invention.

FIGS. 25A–25B illustrate simulation results in terms of the Utilization of Link of one connection in a multiple connection network executing Reno (FRFR) algorithm and Fast Recovery Plus (FR+) algorithm in high-speed links with congestion. FIG. 25A shows the Utilization of Link between Server and Router1 (Y-axis) as a function of time (X-axis) when executing Reno (FRFR) algorithm. FIG. 25B shows the Utilization of Link between Server and Router1 as a function of time (X-axis) when executing Fast Recovery Plus (FR+) algorithm according to an embodiment of the present invention.

FIGS. 26A–26B illustrate simulation results in terms of the Queue Size in the Router of a multiple connection network executing Reno (FRFR) algorithm and Fast Recovery Plus (FR+) algorithm in high-speed links with congestion. FIG. 26A shows the Queue Size in the Router (Y-axis) as a function of time (X-axis) when executing Fast Recovery Plus (FR+) algorithm according to an embodiment of the present invention. FIG. 26B shows the Queue Size in the Router as a function of time (X-axis) when executing Reno (FRFR) algorithm.

FIG. 27 illustrates a chart of simulation results in terms of data overflow in a multiple connection network executing Reno (FRFR) algorithm and Fast Recovery Plus (FR+) algorithm in high-speed links with congestion.

During simulations, FR+algorithm has been called 494 times together, with no packet loss in the next data window 403 times, with one packet loss 72 times, with 2 or more packet loss 19 times.

In FIG. 27, congestion in FR+algorithm occurs thrice (three times). At the same time, TimeOut at the TCP source node 310 is observed, and at the same time point shown in FIGS. 24A–24B, the congestion window CWND decreases very sharply, which means congestion is detected by the TCP sender. And some action to the congestion has been done.

When the speed of link is high enough, even there exists some congestion, the Fast Recovery Plus (FR+) algorithm is dramatically improved the performance of the TCP connection. By increasing the value of Ssthresh when packet loss, FR+succeeds to recover CWND very quickly. And by recording the number of packet loss, FR+can detect the congestion in the network.

The following are the result of fairness $F_{FR+}$=99.77%

$F_{FRFR}$=99.85%

Both FR+and FRFR algorithms show good fairness.

3) Evaluation of Fast Recovery Plus (FR+) Algorithm in Multiple Connection

From these simulations, it can be seen that FR+algorithm is efficient in the wireless network with high transmission error. Similar to the single connection simulations, FR+algorithm can efficiently improve the performance of TCP connection, no matter with congestion or without congestion. And FR+algorithm shows good fairness in these simulations.

As described from the foregoing, the Fast Recovery Plus (FR+) algorithm according to an embodiment of the present invention is oriented to noisy wireless networks. Such Fast Recovery Plus (FR+) algorithm is advantageously provided to distinguish the reason of packet loss by recording the times of retransmit. As such, FR+algorithm has the following advantages: (1) to distinguish the type of packet loss, burst or random; (2) when random packet lost is due to BER, the TCP module 314 of the source node 310 may reset its slow start threshold "Ssthresh" and come into Slow-Start, which may permit recovery to its original speed much more quickly than normal flow control and congestion control algorithms. As a result, the data throughput of TCP connection can be significantly improved, especially in the TCP/IP network with long time delay; (3) before the Fast Recovery Plus (FR+) algorithm determines the reason of packet loss, the TCP source node may conservatively act as if congestion occurs. So when packets lose due to congestion, the Fast Recovery Plus (FR+) algorithm may not delay its response to avoid the congestion; (4) can easily be realized and can cooperate with most of the TCP flow control and congestion avoidance algorithms, with only some slight modification required; and (5) require no support from the destination node or from the network. Based on the above analysis and simulations, the FR+algorithm is very suitable to wireless networks. The CWND can be recovered very quickly by resetting "Ssthresh" in order to significantly improve the data throughput of TCP connections, especially in noisy and long-delay networks.

While there have been illustrated and described what are considered to be preferred embodiments of the present invention, it will be understood by those skilled in the art that various changes and modifications may be made, and equivalents may be substituted for elements thereof without departing from the true scope of the present invention. Further, many modifications may be made to adapt a particular situation to the teachings of the present invention without departing from the central scope of the present invention. Therefore, it is intended that the present invention not be limited to the particular embodiment disclosed as the best mode contemplated for carrying out the present invention, but that the present invention includes all embodiments falling within the scope of the appended claims.

What is claimed is:

1. A method of flow control and congestion avoidance congestion in a network, comprising:

transmitting, at a source node, data packets to a destination node, via at least an intermediate node;

receiving, at the destination node, data packets transmitted from the source node, via the intermediate node, and generating a duplicate ACK back to the source node to inform the source node that a data packet was received out-of-order in the network and serves as an indication that a data packet has been lost;

upon receipt of a designated number of duplicate ACKs, at the source node, determining that a data packet has been lost;

initializing a counter, at the source node, and recording a congestion window CWND, a slow start threshold Ssthresh, and a maximal sequence number SN that has been sent into the network;

upon receipt of a next duplicate ACK, at the source node, recording its acknowledged sequence number ACK_SN;

determining, at the source node, if the acknowledged sequence number ACK_SN is no more than a recorded sequence number SN;

if the acknowledged sequence number ACK_SN is more than the recorded sequence number SN, incrementing the counter, at the source node, and re-transmitting a lost packet;

if the acknowledged sequence number ACK_SN is no more than the recorded sequence number SN, determining if the packet loss is due to a transmission error; and if the packet loss is due to the transmission error, setting, at the source node, the slow start threshold Ssthresh to Max(CWND, (Ssthresh+CWND)/2), wherein said CWND and Ssthresh exhibit values previously recorded.

2. The method as claimed in claim 1, wherein said counter is set to record the number of times of packet re-transmission invoked by the duplicate ACKs.

3. The method as claimed in claim 1, wherein said packet loss is due to the transmission error, when the value of the counter is no more than a pre-defined packet threshold indicating the threshold of packet loss.

4. The method as claimed in claim 1, wherein said network corresponds to a TCP/IP packet-switched network for wireless and/or mobile network applications.

5. The method as claimed in claim 1, wherein said slow start threshold Ssthresh is set to no more than Max (FlightSize/2, 2*SMSS), wherein said FlightSize indicates the amount of outstanding data in the network, and said SMSS indicates the size of a largest data segment that can be transmitted.

6. The method as claimed in claim 1, wherein said packet loss is due to congestion, when the value of the counter is more than a pre-defined packet threshold indicating the threshold of packet loss.

7. The method as claimed in claim 6, wherein said congestion window CWND is reduced to halve (½), and said slow start threshold Ssthresh is reduced to said congestion window to slow a transmission rate to avoid congestion in the network, when said packet loss is due to congestion.

8. The method as claimed in claim 1, wherein said network corresponds to one or more TCP/ATM network, TCP/ISF network, and satellite network for wireless and/or mobile network applications.

9. A method of flow control and congestion avoidance a source node in a network including a destination node, comprising:

upon receipt of duplicate ACKs from a destination node indicating that a data packet has been lost, re-setting a counter and recording a congestion window CWND, a slow start threshold Ssthresh, and a current maximal sequence number SN that has been sent into the network;

upon receipt of a next duplicate ACK, at the source node, recording its acknowledged sequence number ACK_SN;

determining if the acknowledged sequence number ACK_SN is no less than a recorded sequence number SN;

if the acknowledged sequence number ACK_SN is no less than the recorded sequence number SN, incrementing the counter, and re-transmitting a lost packet;

if the acknowledged sequence number ACK_SN is no more than the recorded sequence number SN, determining if the packet loss is due to a transmission error; and if the packet loss is due to the transmission error, setting the slow start threshold Ssthresh to Max(CWND, (Ssthresh+CWND)/2), wherein said CWND and Ssthresh exhibit values previously recorded.

10. The method as claimed in claim 9, wherein said counter is set to record the number of times of packet re-transmission invoked by the duplicate ACKs.

11. The method as claimed in claim 9, wherein said packet loss is due to the transmission error, when the value of the counter is no more than a pre-defined packet threshold indicating the threshold of packet loss.

12. The method as claimed in claim 9, wherein said packet loss is due to congestion, when the value of the counter is more than a pre-defined packet threshold indicating the threshold of packet loss.

13. The method as claimed in claim 12, wherein said congestion window CWND is reduced to halve (½), and said slow start threshold Ssthresh is reduced to said congestion window to slow a transmission rate to avoid congestion in the network, when said packet loss is due to congestion.

14. The method as claimed in claim 9, wherein said network corresponds to one or more TCP/ATM network, TCP/ISF network, and satellite network for wireless and/or mobile network applications.

15. A data network for wireless and/or mobile network applications, comprising:

a source node for transmitting data packets;

a destination node for receiving the data packets from the source node and generating duplicate ACKs when the arrival of data packets is out-of-order; and at least one intermediate node disposed between said source node and said destination node; wherein said source node includes a Fast Recovery Plus (FR+) algorithm which, when activated upon receipt duplicate ACKs, performs the following:

initializing a counter and recording a congestion window CWND, a slow start threshold Ssthresh, and a current maximal sequence number SN that has been sent into the network;

upon receipt of a next duplicate ACK, recording its acknowledged sequence number ACK_SN;

determining if the acknowledged sequence number ACK_SN is no less than a recorded sequence number SN;

if the acknowledged sequence number ACK_SN is no less than the recorded sequence number SN, incrementing the counter, and re-transmitting a lost packet;

if the acknowledged sequence number ACK_SN is no more than the recorded sequence number SN, determining if the packet loss is due to a transmission error; and if the packet loss is due to the transmission error, setting the slow start threshold Ssthresh to Max(CWND, (Ssthresh+CWND)/2), wherein said CWND and Ssthresh exhibit values previously recorded.

16. The data network as claimed in claim 15, wherein said counter is set to record the number of times of packet re-transmission invoked by the duplicate ACKS.

17. The data network as claimed in claim 15, wherein said packet loss is due to the transmission error, when the value of the counter is no more than a pre-defined packet threshold indicating the threshold of packet loss.

18. The data network as claimed in claim 15, wherein said packet loss is due to congestion, when the value of the counter is more than a pre-defined packet threshold indicating the threshold of packet loss.

19. The data network as claimed in claim 15, wherein said congestion window CWND is reduced to halve (½), and said slow start threshold Ssthresh is reduced to said congestion window to slow a transmission rate to avoid congestion in the network, when said packet loss is due to congestion.

20. A computer readable medium having an enhanced Fast Recovery Plus (FR+) algorithm for wireless network applications, via a network, when executed by a host system, performs:

upon receipt of duplicate ACKs from a remote system, determining that a data packet has been lost;

initializing a counter, and recording a congestion window CWND, a slow start threshold Ssthresh, and a maximal sequence number SN that has been sent into the network;

upon receipt of a next duplicate ACK, recording its acknowledged sequence number ACK_SN;

determining if the acknowledged sequence number ACK_SN is no more than a recorded sequence number SN;

if the acknowledged sequence number ACK_SN is more than the recorded sequence number SN, incrementing the counter, and re-transmitting a lost packet;

if the acknowledged sequence number ACK_SN is no more than the recorded sequence number SN, determining if the packet loss is due to a transmission error; and if the packet loss is due to the transmission error, setting the slow start threshold Ssthresh to Max (CWND, (Ssthresh+CWND)/2), wherein said CWND and Ssthresh exhibit values previously recorded.

21. The computer usable medium as claimed in claim 20, wherein said counter is set to record the number of times of packet re-transmission invoked by the duplicate ACKs.

22. The computer usable medium as claimed in claim 20, wherein said packet loss is due to the transmission error, when the value of the counter is no more than a pre-defined packet threshold indicating the threshold of packet loss.

23. The computer usable medium as claimed in claim 20, wherein said packet loss is due to congestion, when the value of the counter is more than a pre-defined packet threshold indicating the threshold of packet loss.

24. The computer usable medium as claimed in claim 20, wherein said congestion window CWND is reduced to halve (½), and said slow start threshold Ssthresh is reduced to said congestion window to slow a transmission rate to avoid congestion in the network, when said packet loss is due to congestion.

25. A host system comprising:
a processor for generating data;
a network module connected to a remote system, via a network, having a data recovery mechanism installed therein for flow control and congestion avoidance in the network, the data recovery mechanism, activated when a data packet has been lost, performing the following:
recording a congestion window "CWND" and a slow start threshold "Ssthresh" set to regulate a transmission rate of data packets to avoid congestion in the network;
determining if the data packet loss is due to a transmission error; and
if the data packet loss is due to a transmission error, setting the slow start threshold "Ssthresh" to Max ("CWND", ("Ssthresh"+"CWND")/2), wherein the congestion window "CWND" and the slow start threshold "Ssthresh" exhibit values previously recorded.

26. The host system as claimed in claim 25, wherein the congestion window "CWND" is reduced to halve (½), and the slow start threshold "Ssthresh" is reduced to the congestion window to slow a transmission rate of data packets to avoid congestion in the network, when the data packet loss is due to congestion.

27. The host system as claimed in claim 25, wherein said network corresponds to one or more TCP/ATM network, TCP/ISF network, and satellite network for wireless and/or mobile network applications.

28. A packet-switched telecommunication network comprising:
network nodes interconnected by transmission links;
user terminals connected to the network nodes, said user terminals acting as source nodes which transmit data packets and destination nodes which receive data packets;
wherein each user terminal includes a data recovery mechanism installed therein for flow control and congestion avoidance in the network, and activated when data packets have been lost, said data recovery mechanism performing the following:
recording a congestion window "CWND" and a slow start threshold "Ssthresh" set to regulate a transmission rate of data packets to avoid congestion in the network;
determining if the data packet loss is due to a transmission error; and
if the data packet loss is due to a transmission error, setting the slow start threshold "Ssthresh" to Max ("CWND", ("Ssthresh"+"CWND")/2), wherein the congestion window "CWND" and the slow start threshold "Ssthresh" exhibit values previously recorded.

29. The packet-switched telecommunication network as claimed in claim 28, wherein the congestion window "CWND" is reduced to halve (½), and the slow start threshold "Ssthresh" is reduced to the congestion window to slow a transmission rate of data packets to avoid congestion in the network, when the data packet loss is due to congestion.

30. The packet-switched telecommunication network as claimed in claim 29, wherein the slow start threshold Ssthresh is set to no more than Max(FlightSize/2, 2*SMSS), where the FlightSize indicates the amount of outstanding data in the network, and the SMSS indicates the size of a largest data segment that can be transmitted via the network.

* * * * *